United States Patent [19]

Durham, III

[11] Patent Number: 5,665,965
[45] Date of Patent: Sep. 9, 1997

[54] ENCODER APPARATUS AND METHODS EMPLOYING OPTICAL AND GRAPHICAL PROGRAMMING

[75] Inventor: Ormonde G. Durham, III, Jordanville, N.Y.

[73] Assignee: Opto Generic Devices Inc., Van Hornesville, N.Y.

[21] Appl. No.: 711,629

[22] Filed: Sep. 5, 1996

Related U.S. Application Data

[63] Continuation-in-part of Ser. No. 394,473, Feb. 27, 1995, abandoned.

[51] Int. Cl.[6] .................................................. G01D 5/34
[52] U.S. Cl. ........................... 250/231.13; 250/231.16; 250/214 PR; 318/439
[58] Field of Search ........................ 250/231.16, 231.13, 250/237 G, 237 R, 214 PR; 318/254, 640, 652, 439, 480, 77, 78; 341/13

[56] References Cited

U.S. PATENT DOCUMENTS

| | | | |
|---|---|---|---|
| 3,193,744 | 7/1965 | Seward | 318/18 |
| 3,634,672 | 1/1972 | Weatherred | 235/193.5 |
| 3,728,551 | 4/1973 | Culver et al. | 250/231 SE |
| 3,757,128 | 9/1973 | Vermeulen | 250/231.16 |
| 4,008,425 | 2/1977 | Dickey | 318/314 |
| 4,158,800 | 6/1979 | Jahelka et al. | 318/685 |
| 4,160,200 | 7/1979 | Imamura et al. | 318/616 |
| 4,190,793 | 2/1980 | Parker et al. | 318/800 |
| 4,224,515 | 9/1980 | Terrell | 250/231 |
| 4,225,787 | 9/1980 | Shapiro et al. | 250/406 |
| 4,227,137 | 10/1980 | Hartman | 318/801 |
| 4,286,203 | 8/1981 | Ehret | 318/801 |
| 4,353,016 | 10/1982 | Born | 318/254 |
| 4,429,267 | 1/1984 | Veale | 318/594 |
| 4,438,376 | 3/1984 | Varnovitsky | 318/78 |
| 4,588,936 | 5/1986 | Itoh et al. | 318/594 |
| 4,599,547 | 7/1986 | Ho | 318/594 |
| 4,689,540 | 8/1987 | Tani et al. | 318/608 |
| 4,717,864 | 1/1988 | Fultz | 318/254 |
| 4,736,140 | 4/1988 | Ernst | 318/77 |
| 4,833,316 | 5/1989 | Yoneda | 250/231.16 |
| 4,864,300 | 9/1989 | Zaremba | 341/6 |
| 4,882,524 | 11/1989 | Lee | 318/254 |
| 4,902,885 | 2/1990 | Kojima et al. | 250/231.13 |
| 5,103,225 | 4/1992 | Dolan et al. | 341/13 |
| 5,172,039 | 12/1992 | Owens | 318/489 |
| 5,177,393 | 1/1993 | Webber | 310/68 B |
| 5,198,738 | 3/1993 | Blaser et al. | 318/652 |
| 5,250,884 | 10/1993 | Okumura | 318/560 |

FOREIGN PATENT DOCUMENTS 5791683  6/1982  Japan.

*Primary Examiner*—Que Le
*Attorney, Agent, or Firm*—Trapani & Molldrem

[57] ABSTRACT

Optical encoder apparatus and methods are provided for converting the cyclic motion of an electro-mechanical machine, such as an electric motor, into at least one electrical signal having a predetermined waveform. The apparatus may include at least one photo-detector which is responsive to at least one pattern of incident radiant energy. An optically programmed system is optically aligned with the detector, and configured to be actuated by the cyclic motion of the machine. The system modifies at least one pattern of incident radiant energy at the detector, in a plurality of directions, in accordance with an optical function which includes graphical function. The graphical function may be a transform of a waveform function. The system includes an optical element, such as an optical encoder disc, which contains at least one optically detectable graphical pattern. The system also includes a mask containing at least one aperture which permits a pattern of radiant energy to pass to the detector. The energy at the photo-detector is converted into an electrical signal having a predetermined waveform.

65 Claims, 22 Drawing Sheets

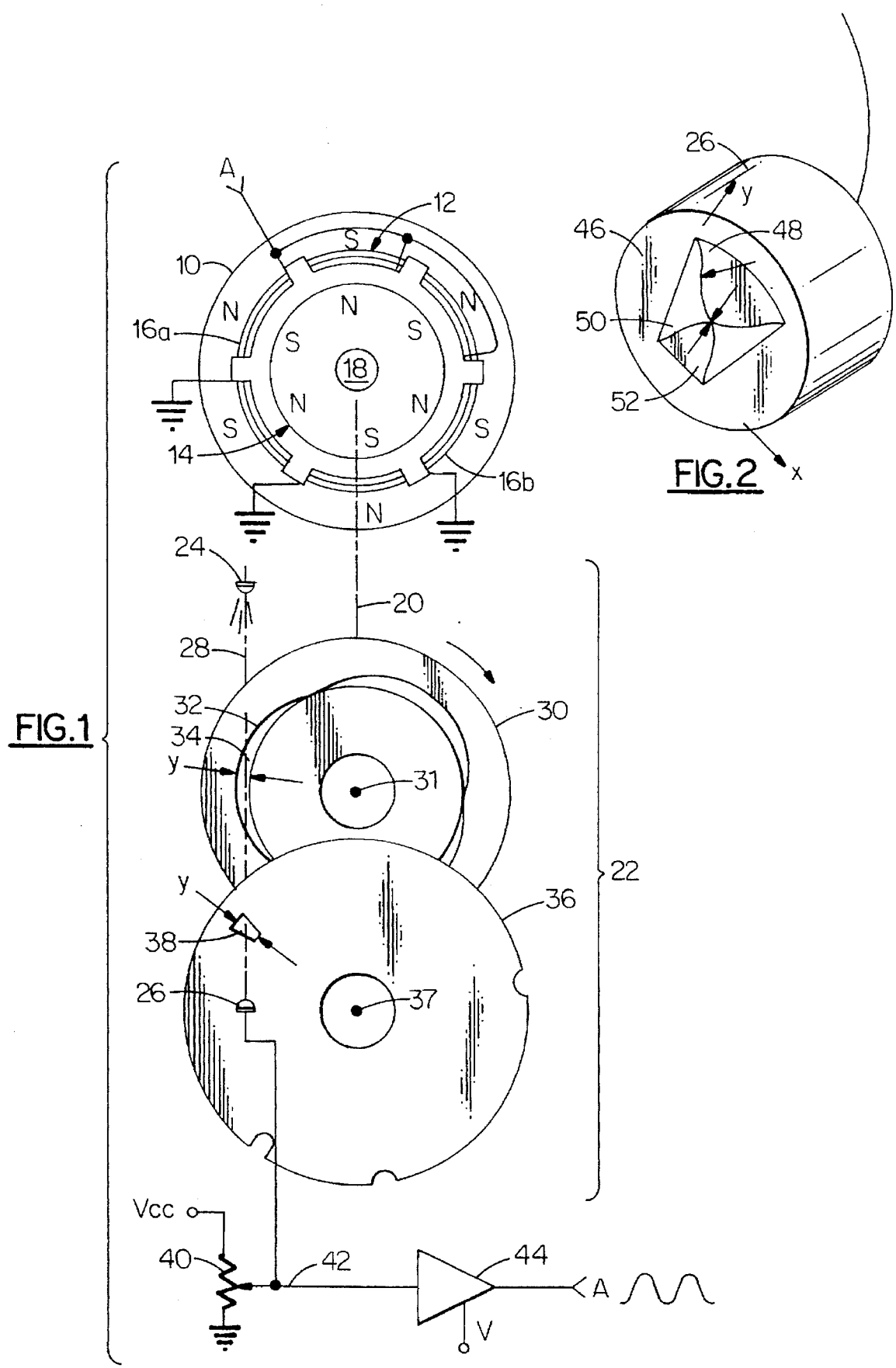

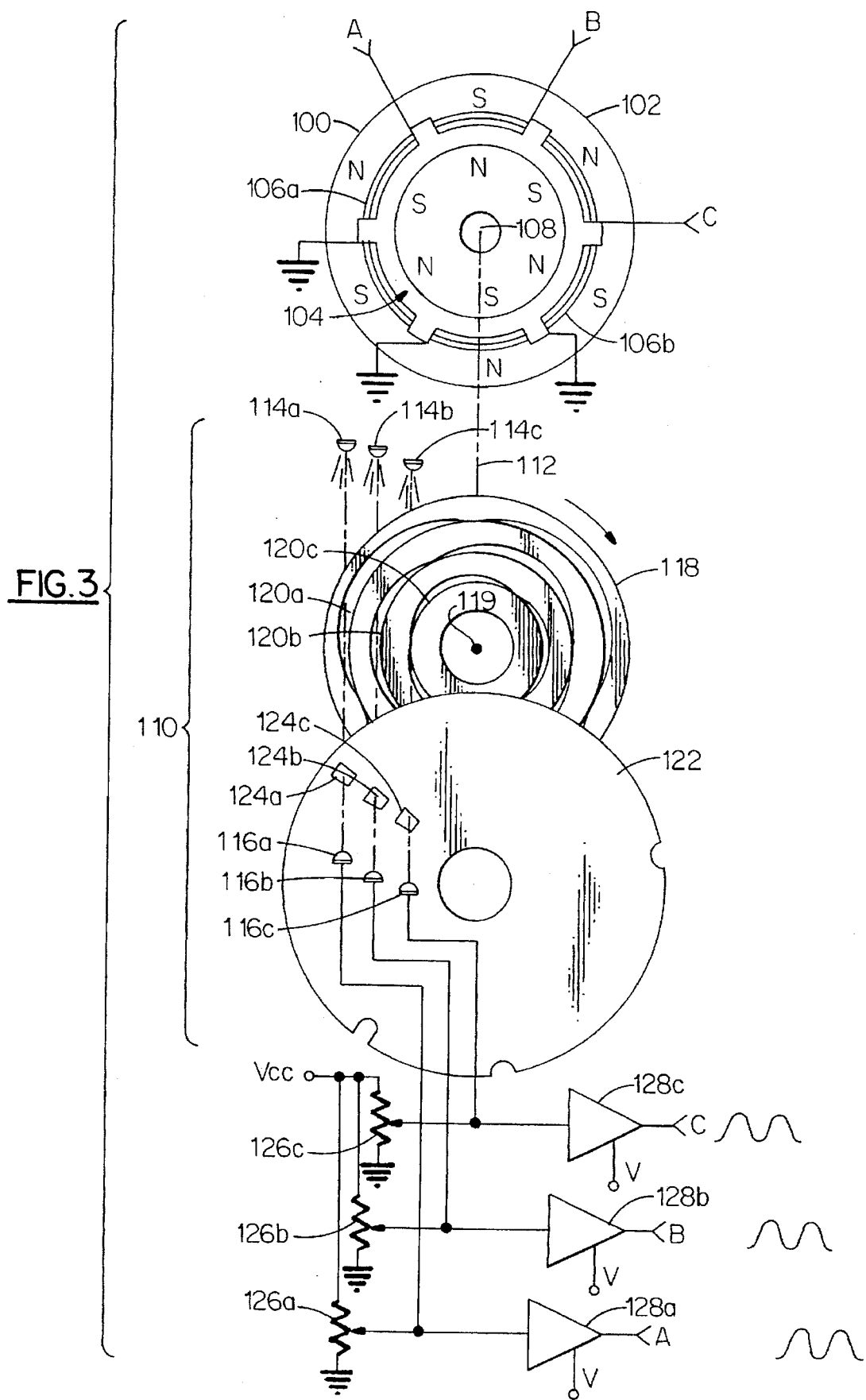

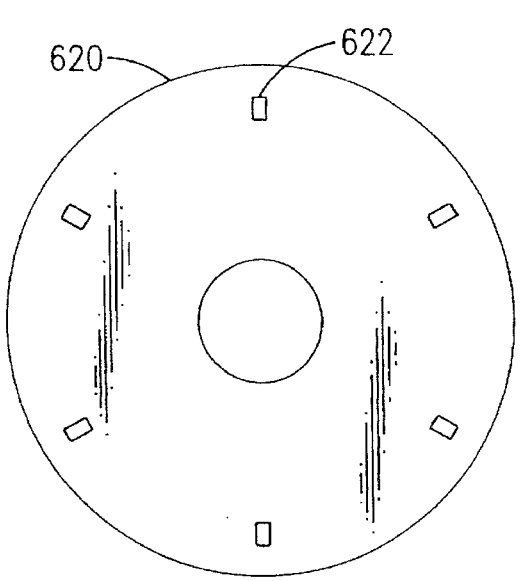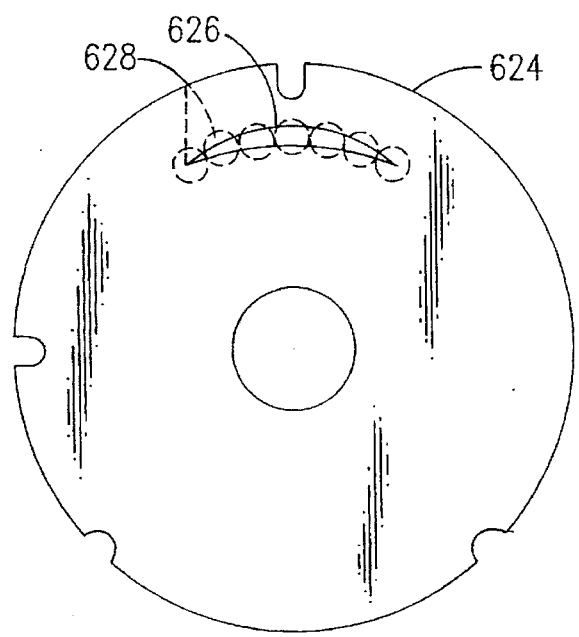
FIG.14A          FIG.14B
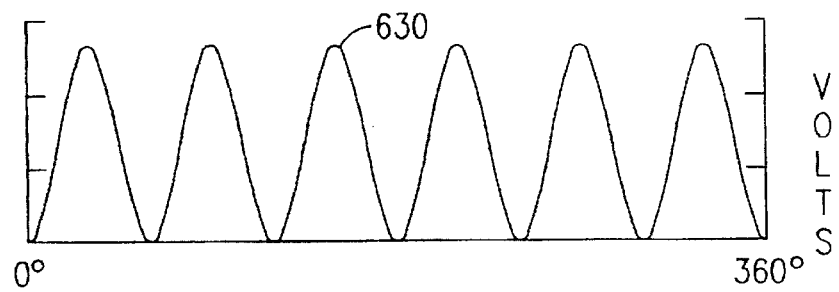
FIG.14C
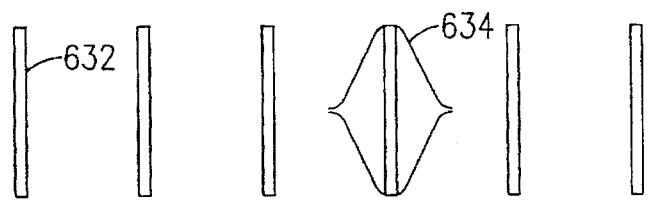
FIG.14D

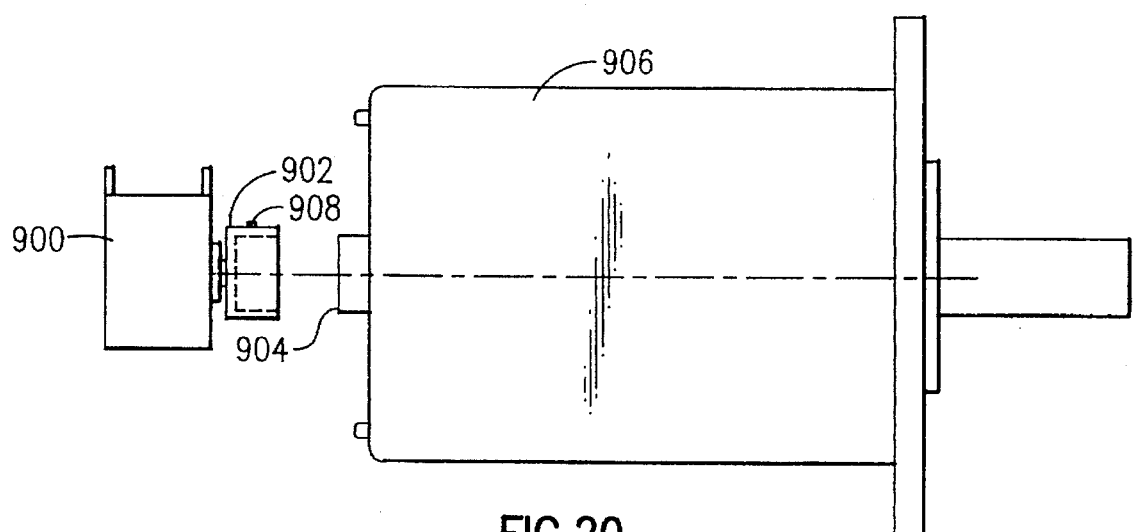
FIG.20
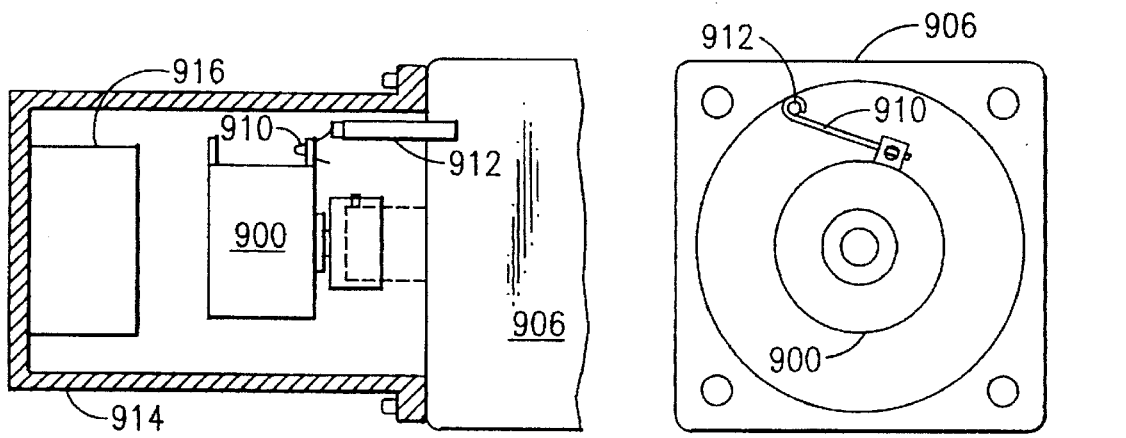
FIG.21
FIG.22
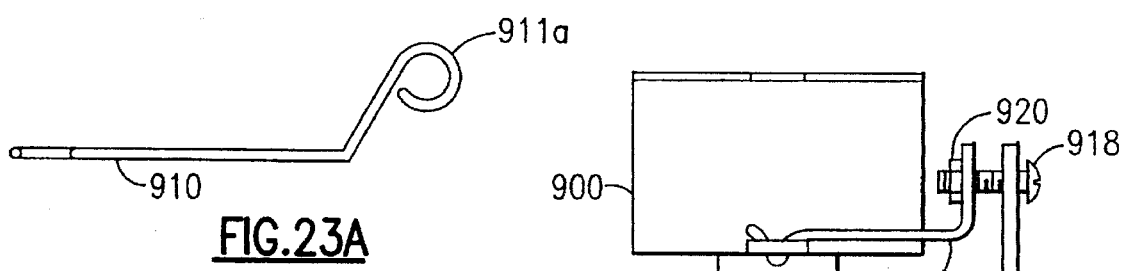
FIG.23A
FIG.23B
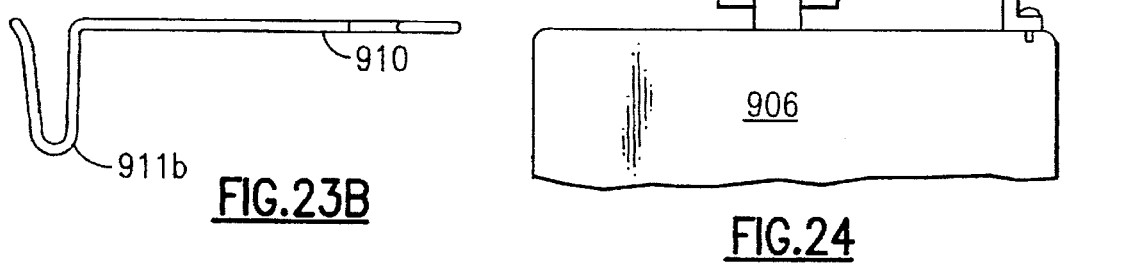
FIG.24

ENCODER APPARATUS AND METHODS EMPLOYING OPTICAL AND GRAPHICAL PROGRAMMING

CROSS REFERENCES TO RELATED APPLICATIONS

This application is a continuation in part of application Ser. No. 08/394,473 filed Feb. 27, 1995, now abandoned.

BACKGROUND OF THE INVENTION

1. Technical Field

The present invention relates generally to encoder apparatus and methods, and, more particular to encoder apparatus and methods for converting the cyclic motion of an electromechanical machine into meaningful electrical signals which can be used in a number of applications. One such application involves direct commutation of the electromechanical machine from which the encoder generated the electrical signal. An important field of such apparatus and methods concerns the control of electric motor operation.

2. Background Art

The most relevant background art to the present invention is found in the field of electric motor control and commutation. However, it is to be understood that the present invention is not limited to this field. Since the most important application of the present invention relates to the control of electric motor operation, the following discussion will relate primarily to this field.

In addition, most of the current applications of the present invention involve optical encoder implementations. However, it is to be understood that the present invention is not so limited. Since most current applications of the present invention concern optical encoding, the following disclosure will primarily address optical encoding and optical encoder embodiments.

The present invention may be implemented as a simple variable speed control device and method for A.C. motors which can additionally improve or enhance the motor's normal operating efficiencies. This implementation involves direct optical-to-electrical commutation of single and multiphase A.C. induction motors, but also can be adapted for other A.C. and brushless D.C. motors.

Generally, commutation for A.C. induction motors involves using the A.C. power frequency to provide an induced current in the appropriate stator windings, creating a magnetic flux which, in turn, induces a current and resulting magnetic flux in the armature windings. When properly synchronized or matched, a torque or force is created between the two fluxes which causes the armature to move.

The motion of the armature, or motor speed, is directly proportional to the frequency of the input power at a specific voltage level. Normally A.C. motor input voltage and frequency are fixed, which in turn fixes the speed of the armature. In A.C. induction motors, a level of "frequency slip" is experienced between the stator and armature frequencies. That is, the speed of the armature is less than the speed of the stator's magnetic field. Control over the speed of the armature can be achieved by proper coordination of different frequencies, voltages, numbers of poles, numbers of windings or phases, amount of slip, etc.

Current methods of varying and controlling the speed of an A.C. motor (or brushless D.C. motor) usually involves some sort of motor-connected, speed sensing device that supplies feedback or input signals to a microprocessor, inverter or vector controller and driver, which are then analyzed, adjusted, varied, shaped, etc., to match frequency, voltage and power needs of the motor. The signal(s) from the microprocessor, inverter or vector drive, controls the frequency, power pulse widths, current and voltage amplitude(s), phasing(s) or various combinations of such parameters. These prior methods are generally complex, costly and cumbersome. They usually require a speed sensing input device or method, a separate analysis and control signal shaping unit, and a driver for power output, all of which must be properly connected and synchronized with each other.

The present invention differs from the above-mentioned methods by using a single device to sense, analyze and control speed as well as improve torque and power output, while using less energy. Similar to other methods, the present invention links motor speed to input power frequency and voltage, but accomplishes this link without most of the components used by other variable speed methods. The encoder of the present invention utilizes the novel concept of "optical programmability" to match, fit, profile and control, via direct commutation, the motor's speed, direction, slip, phasing, as well as improve torque and power while using less energy.

Others have disclosed methods of using optical encoders for D.C. electric motor commutation control. However, in these methods, the optical elements used—light emitters, detectors and encoder discs—could just as readily be resistive, magnetic or "electrically" varying elements. This is because these methods concern only one-dimensional optical "shuttering," i.e., merely diminishing and increasing light intensity, or blocking and unblocking the light path, to create either a sine wave or square wave output. Such waveforms could be similarly produced by non-optical elements.

The following patents disclose optical encoders employing a rotating encoder disc working in combination with a fixed disc, mask or reticle to produce a sinusoidal signal waveform: U.S. Pat. No. 3,193,744 to Seward; U.S. Pat. No. 4,160,200 to Imamura; U.S. Pat. No. 4,224,515 to Terrell; U.S. Pat. No. 4,429,267 to Veale; U.S. Pat. No. 4,599,547 to Ho; and U.S. Pat. No. 5,103,225 to Dolan et al. The following patents disclose the use of an optical encoder employing only an encoding disc or wheel, without a stationary mask or reticle, which produces square pulses for use in commutation and tachometer functions: U.S. Pat. No. 4,353,016 to Born; U.S. Pat. No. 4,882,524 to Lee; and U.S. Pat. No. 5,198,738 to Blaser et al. Finally, U.S. Pat. No. 5,177,393 to Webber discloses an optical encoder used for commutation of a D.C. brushless motor, employing a reflective encoder disc printed with a sinusoidal pattern.

All of the encoders disclosed in these patents are limited in that they cannot optically shape the waveform of the motor commutation signals to any desired form to optimize control of the motor's speed, direction, slip, phasing, torque and power output. In other words, they are not "optically programmable". In addition, many of the encoders proposed in these patents require additional commutation "control" components to produce square wave drive signals and match them to the poles and windings of the motor. Moreover, all of the above patented encoders depend on the physical placement, size, shape and interaction of all the optical elements. Finally, the encoders of these patents do not propose flexibility in design, or practical and affordable implementations.

The apparatus and methods of the present invention employ the optical encoder, itself, as an "optically programmable" device, which can directly sense, interpret and convert mechanical motion of a machine into programmed electrical signals that are compatible with the machine or with other control elements. The encoder is optically programmed, in that it implements a predetermined optical function and includes optical elements which can be graphically or geometrically shaped to represent almost any mathematical or algebraic waveform function. The encoder can produce at least one electrical signal having a predetermined waveform which is a transform of the optical function. Since the electrical signal is a direct result of the "cyclic" motion of the machine to which the encoder is coupled, it can be used to control (like a normal encoder), shape and enhance (like a microprocessor), modify and commutate (like a converter) and vary (like an amplifier). The term "cyclic," for the purposes of this application, is intended to include without limitation, recurring, repeating, periodic, rotating, reciprocating, and harmonic motion.

Optical programming includes the concept of "graphical programming". Graphical programming is the process of configuring encoder elements (e.g., an optical encoder disk) with graphically or geometrically shaped patterns or areas which are capable of being sensed during operation of the encoder. These graphically or geometrically shaped patterns or areas are defined by graphical functions (hereinafter described) which are, in turn, usually derived from mathematically or algebraically defined waveform functions (hereinafter described). In a preferred graphical programming procedure, the electrical signal to be created by the encoder is first specified. Then, a waveform function is determined and used to derive (e.g., by area-fill equations—described hereinbelow) a graphical function which, in turn, defines the graphically or geometrically shaped patterns or areas.

Graphical programming can be applied to any type of encoder in which the graphically shaped patterns or areas can be sensed. For example, capacitive encoders, such as those described in U.S. Pat. No. 5,172,039 to Owens and U.S. Pat. No. 4,864,300 to Zaremba, utilize conducting plates or patterns to produce variable capacitance between a rotating encoder element and a stationary encoder element. The variable capacitance is made part of an electrical circuit which produces the electrical signal output of the encoder. Such capacitive encoders could employ graphical programming, in that the stationary and rotating capacitive plates could be graphically or geometrically shaped. Such a capacitive embodiment would involve the multiplication of areas of at least two graphical or geometric shapes, co-defined by a graphical function. In another possible example, Hall Effect sensors may be used in combination with magnetic strips or patterns which are graphically or geometrically shaped.

It is the ability of the apparatus and methods of the present invention to create, shape, modify and control almost any mathematical or algebraic electronic output waveform pattern, via optical programming or graphical programming, that sets the present invention apart from methods and apparatus heretofore proposed.

3. Inventor's Philosophy

My view, approach and perspective on encoders and encoding are very much analogous to electronics and electrical circuits. Specifically, I believe that optical encoding (OE) is at a similar threshold as integrated circuits (IC's) were for electronics some 30 to 40 years ago. IC's in many ways were merely repackaging of prior electronic circuits. This repackaging was initially nothing more than taking existing electronic circuits, components, etc. and integrating them into a single, smaller, more cost-effective usable device. However, that simple "repackaging" quickly evolved, and even revolutionized, not just the repackaging of existing circuits, but literally created new markets, industries, and electronic circuits. Many of such circuits were only conceptualized or mathematically represented prior to the IC, and in some cases not even conceived. Yet such circuits were made possible by this "repackaging" or consolidating into a single product approach.

I believe that my approach to encoding methods, specifically optical encoding, stands at a similar threshold. There are various optical encoding techniques in existence today, but the "repackaging" into a single or miniaturized cost-effective, compact product, as my generic approach does, affords similar scenarios of possibilities.

To further illustrate the analogy, I have now developed in a single OE package, an "optical programming" method that has given optical encoding new application possibilities never heretofore utilized or, in some cases, even envisioned by this "single product method".

Like the IC, in some cases, many of these applications already existed in other forms or with other multiple components. My method and approach has consolidated these into a singular product. However, as with IC's, I have also been able to reduce to practice concepts only heretofore mathematically represented, or which could never be affordably or practically constructed.

Further, I believe that I have likewise created and invented additional new concepts and applications never heretofore explored or contemplated prior to my new "IC approach". This "optical programmability" (op) that I have developed in connection with an optical encoder (OE) can be likened to a type of microprocessor (micro or µp), in that a micro is a unique series of electronic circuits, representing various capabilities, adaptability, and "programmability" oftentimes on a single IC chip.

I have likewise developed "programmability", or various application capabilities and processing abilities like a µp or micro, but consolidated into a single cohesive package (like an IC). It is this novel, unique concept of equating the encoder, optical encoding, optical programming, generic capability into one package, that makes my method analogous to the integrated circuit and micro. As the IC helped to evolve and create the micro which in turn opened up new concepts of electronic applications, and capability, and even industries, so may/should optical encoding and optical programmability.

It is thus my contention that the present invention and concept of optical encoding and optical programming stand where integrated circuits and microprocessors stood some 30 to 40 years ago. The extent and range of the capabilities, possibilities, products, and industries are only just now being slightly scratched by my approach.

It is this ubiquitous, generic expectation that I have for optically programmed encoders that makes this concept and product so exciting, unique and limitless in possibilities.

OBJECTS AND SUMMARY OF THE INVENTION

It is therefore an object of the present invention to provide encoder apparatus and methods that avoid the limits and problems associated with prior encoders.

It is another object of the present invention to provide encoder apparatus and methods that employ the concept of optical or graphical programmability, to generate many different electrical signal waveforms, customized for particular applications.

It is a further object of the present invention to provide encoder apparatus, the elements of which can be optically programmed or graphically programmed to generate a desired electrical signal waveform.

It is yet another object of the present invention to provide encoder apparatus and methods for directly driving and controlling single and multi-phase A.C. motors and brushless D.C. motors.

It is yet a further object, of the present invention to provide encoder apparatus and methods that rely on a single device to sense, analyze and control motor speed.

It is still another object of the present invention to provide encoder apparatus and methods that minimize the need for electrical or electronic devices to control motor operation.

It is still a further object of the present invention to provide encoder apparatus and methods that improve efficiency, torque and power output.

It is still another object of the present invention to utilize the optical programmability or graphical programmability of the encoder apparatus alone, or in conjunction with associated electronic capabilities of the motor drive circuit, to significantly improve power factor and reduce or eliminate power line harmonic distortion.

It is still another object of the present invention to provide encoder apparatus and methods that are universally suitable for A.C. induction, A.C. synchronous, A.C. slip, D.C. brushless, D.C. stepper, single phase, multi-phase, few pole, many pole embodiments, and other motion control applications.

It is still another object of the present invention to construct encoder apparatus in a simple and complete package that can easily attach to most motor shafts without having to modify each motor or utilize heavy and cumbersome attachment fixtures.

These and other objects are attained in accordance with the present invention wherein there is provided an encoder apparatus for converting the cyclic motion of an electromechanical machine into at least one electrical signal having a predetermined waveform. In an optical encoder embodiment, the encoder apparatus includes at least one photo-detector which responds to a pattern of incident radiant energy to generate an electrical signal therefrom.

An optically programmed means is optically aligned with the photo-detector and configured to be actuated by the cyclic motion of the machine. The optically programmed means modifies at least one pattern of incident radiant energy at the photo-detector, in a plurality of directions, in accordance with an optical function which includes a geometric or graphical function. The geometric or graphical function may be a transform of an equivalent waveform function.

The optically programmed means includes an optical element, such as an optical encoder disc, which contains at least one optically detectable graphical pattern. The pattern includes at least one graphically shaped cycle and may include fractional numbers of such graphical cycles. The programmed means also includes a mask containing at least one graphically shaped aperture which permits a pattern of radiant energy to pass therethrough and to the photo-detector.

The graphical function is first realized by the combined optical effect of the disc graphical pattern and the mask aperture, as one is scanned relative to the other in accordance with the cyclic motion of the machine. The photo-detector has a photo-electric response, and the product of this response and the optical function defines a predetermined waveform. The modified pattern of incident radiant energy at the photo-detector is converted into an electrical signal having the predetermined waveform.

The optically programmed means may also include at least one photo-emitter that emits a supply of radiant energy. The supply of radiant energy from the emitter is coupled to the photo-detector by way of a graphically or geometrically shaped optical path.

The encoder apparatus of the present invention has particular application in efficiently controlling the operation of an electric motor by producing signal waveforms that are specifically matched and synchronized to a particular motor. For example, the encoder may be used as a variable speed controller which synchronizes frequency of the drive signals to the motor speed. In such case, the controller would include an amplifier for amplifying the electrical signals generated by the encoder, and for providing a means for adjusting the voltage level of the drive signals to initiate a speed change.

The encoder apparatus of the present invention may be implemented to convert the rotational motion of an N-phase motor into an N number of electrical signals, each having a predetermined phase relationship suitable for driving the motor. In this case, for an optical encoder embodiment, the encoder has an N number of optical channels, each of which comprises an emitter, a graphical pattern, a mask aperture and a detector. In the preferred embodiment, the graphical patterns are disposed concentrically on an encoder disc which is made to rotate with the motor shaft. One way of effecting the phase difference in the signals is to progressively shift, in angular position, the graphical patterns on the encoder disc. The relative phase of each signal is determined by the relative positions of the graphical pattern and associated mask aperture, at a particular point in a revolution of the motor shaft.

A method of converting the cyclic motion of an electromechanical machine into at least one electrical signal having a predetermined waveform, is also contemplated by the present invention. In addition, methods of controlling the operation, including speed, of an electric motor are contemplated by the present invention.

One particular method of controlling the operation of an A.C. induction motor, in accordance with the present invention, comprises the following steps: (1) coupling to a shaft of a motor, an optical encoder which is optically programmed with a waveform function having a greater number of electrical cycles than is necessary to produce the rated power frequency at the rated speed and power voltage of the motor; (2) generating an encoder output signal that substantially replicates the waveform function for each revolution of the motor shaft; (3) amplifying the encoder output signal to a voltage level that produces the rated speed of the motor; and (4) powering the motor with the amplified encoder output signal. Further, in accordance with this method, the voltage level of the encoder output signal can be varied to vary the speed of the motor and thus vary the frequency of the encoder signal to a specified number.

BRIEF DESCRIPTION OF THE DRAWING

Further objects of the present invention will become apparent from the following description of the preferred embodiments with reference to the accompanying drawing, in which:

FIG. 2 is a schematic representation of a photo-detector element of the optical encoder of FIG. 1, showing an instantaneous pattern of radiant energy incident upon the photo-responsive surface of the detector;

FIG. 3 is a schematic representation of a three channel optical encoder configured in accordance with the present invention, coupled to a three phase A.C. induction motor;

FIGS. 14A-D show, respectively, an optical encoder disc of the present invention having a graphical pattern comprising six apertures, a mask containing an aperture which is graphically shaped for generating a sinusoidal waveform, the corresponding waveform function, and an equivalent linear representation (X-Y) of the graphical pattern of FIG. 14A and corresponding mask aperture;

FIGS. 20-22 are a series of views illustrating the method of attachment of an optical encoder of the present invention to a motor;

FIGS. 23A-B are side elevation and top plan views, respectively, of an anti-rotation clip, used to anchor the housing of an optical encoder of the present invention and adjust its angular position relative to a shaft of a motor;

FIG. 24 is a top plan view of an encoder of the present invention attached to a shaft of a motor, and adjustably anchored to the motor with an anti-rotation clip;

DESCRIPTION OF THE PREFERRED EMBODIMENTS

Figure 17A:
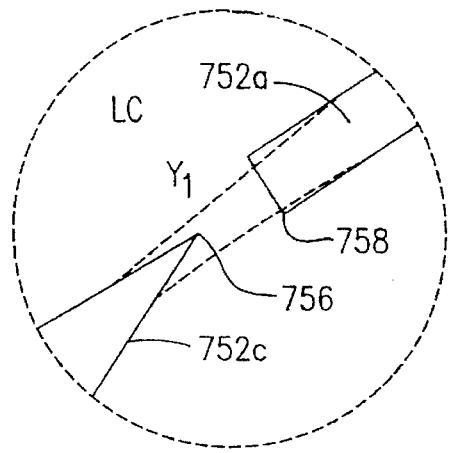
FIGS. 17A-D show, respectively, an optical encoder disc of the present invention having a corrected graphical pattern for generating a repeating non-uniform waveform and showing an enlarged view of the correction, the corresponding corrected and uncorrected waveform functions, an equivalent linear representation (X-Y) of the uncorrected graphical pattern, and an equivalent linear representation (X-Y) of the corrected graphical pattern.
Figures 1, 17A:
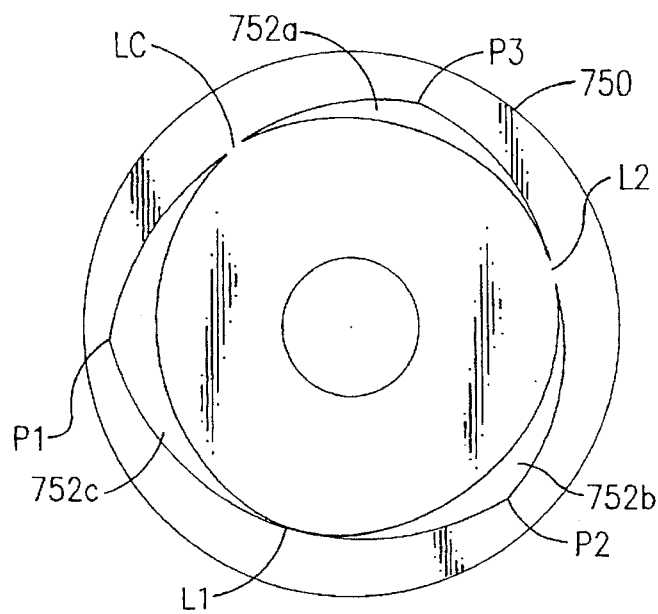
FIG. 1 is a schematic representation of a single channel optical encoder configured in accordance with the present invention, coupled to a single phase A.C. induction motor.

Referring now to FIG. 1, there is shown a schematic representation of the essential elements of an optical encoder embodiment of the present invention. A single phase, three pole pair, A.C. induction motor 10 includes a stator assembly 12 and a rotor assembly 14. Stator 12 includes three pairs of windings. A winding pair 16a and 16b are connected together in series between ground and an A.C. input A. The other winding pairs are similarly connected, and all winding pairs are connected together in parallel as shown. When the windings are energized by an A.C. input signal, six magnetic poles are established in stator 12, and these poles induce a corresponding number of poles in rotor 14. Motor 10 can be started by any well known method such as by a start winding (not shown).

Rotor 14 includes a shaft 18 which rotates about a central axis 20. Coupled to shaft 18 is an optical encoder 22 configured in accordance with the present invention. Encoder 22 includes at least one photo-emitter device 24 which is preferably an infrared light emitting diode (LED). A photo-detector device 26 is aligned with photo-emitter 24, and is responsive to the radiant energy emitted from emitter 24. Detector 26 generates an electrical signal which is proportional to the quantity of radiant energy incident on photo-detector 26. Detector 26 is preferably a photo-transistor. Both emitter 24 and detector 26 are fixed in position and aligned along an optical path 28. An optical element, in the form of an encoder disc 30, is coupled to shaft 18 and is made to rotate with shaft 18. Encoder disc 30 contains an optically detectable graphical pattern 32 which includes at least one graphically shaped cycle 34. In the preferred embodiment, graphic cycle 34 is implemented in the form of an optical window. In many applications involving the control of an electric motor, the number of graphic cycles 34 are equal to the number of pole pairs in the rotor. In addition, cycles 34 are physically (angularly) aligned with the pole pairs. In some applications, this condition of matching the graphic cycles to the poles is not followed, as will be described hereinbelow. Also, it will become clear from the discussion to follow that graphic cycles 34 are not always implemented as discrete optical windows. In some cases, one graphic cycle may gradually transition into another. In addition, cycles 34 could be implemented as opaque areas of a transparent (or translucent) encoder disc. In another embodiment, cycles 34 could be implemented as reflective patterns in a reflective encoder embodiment.

With further reference to FIG. 1, encoder disc 30 has a central axis 31 which is aligned with axis 20 of rotor 18. Disc 30 rotates about central axis 31. Encoder 22 further includes a mask 36 which is preferably in the form of a disc. Mask 36 contains a wedge-shaped aperture 38. Mask 36 has a central axis 37 which is physically aligned with central axis 31 of encoder disc 30. Mask 36 is not coupled to rotor shaft 18, and is intended to remain stationary during operation of encoder 22.

Encoder disc 30 is actuated by the rotating motion of shaft 18, causing graphical pattern 32 to scan through optical path 28. In this sense, disc 30 is optically coupled to optical path 28. As shown in FIG. 1, pattern 32 is coaxially disposed about central axis 31, along an imaginary scan track.

As shown in FIG. 1, aperture 38 of mask 36 is aligned with optical path 28 and pattern 32. The function of aperture 38 is to permit a restricted, and graphically controlled amount of radiant energy to pass to detector 26. The "y" dimension of aperture 38 is equal to the maximum "y" dimension of graphical pattern 32 (See FIG. 1). This dimensional relationship is illustrated, for example, in FIGS. 5C and 7C. FIG. 8C illustrates that the "y" dimension of the mask aperture (360) and the maximum "y" dimension of at least some of the graphic cycles (364b and 364c) may differ.

The dimensions of aperture 38 are preferably smaller than the photo-responsive surface of detector 26. Aperture 38 is configured and dimensioned to ensure that a defined radiant energy pattern is established on the photo-responsive surface of detector 26. This requirement will be further described with reference to FIG. 2 below.

As shown in FIG. 1, a potentiometer 40 is electrically connected between a voltage supply Vcc and ground. The output of detector 26 is electrically connected to an adjustable wiper 42 of pot 40. Wiper 42 is directly connected to a power amplifier 44. Amplifier 44 must be capable of amplifying the low voltage output of detector 26 to a voltage level compatible with driving the windings of motor 10. In many applications, amplifier 44 must amplify the detector output to a level of at least 120 volts RMS. Amplifier 44 can be either a specifically designed and optimized device or a standard, commercially available power amplifier. Even higher efficiency Class "C" (frequency to inductance tuned) amplifiers may be employed when the commutation signals are expected to be sinusoidal. Preferably, the amplifier should have a gain adjustment so that its output can be adjusted.

In some applications, the signal output level of encoder 22 can be adjusted by varying the voltage supply that energizes emitter 24 and/or detector 26. With this approach, encoder signal output level can be varied, for example, between 1.5 volts and 12 volts. Level adjustment could be accomplished automatically, for example, in response to a system control signal.

To complete the encoder feedback loop, the output of amplifier 44 is connected to the input terminal A of motor 10. The signal waveform generated by encoder 22 is directly applied to the windings of motor 10. Accordingly, the present invention provides direct commutation control of motor 10.

It is to be understood that the optical encoders of the present invention are optically programmed. All of the optical elements of the encoder are considered programmable parameters, including, without limitation, photo-emitters and their radiant energy output, encoder discs, mask apertures, lenses, shutters, prisms, and any other optical elements or devices employed to modify a pattern of radiant energy incident on the photo-detection element or elements of the encoder. The characteristics of the optical elements employed in the encoder are selected, configured or adjusted (i.e., programmed) so that the encoder can produce a predetermined electrical signal waveform output. The combined optical response of these optical elements, as configured in the encoder, may be referred to as an optical function. Therefore, the pattern of radiant energy incident on the photo-detector means of the encoder is modified in accordance with an optical function, and this function represents the combined optical response of the optically programmed elements affecting the incident pattern at the photo-detector means.

In the preferred embodiment, the optical function includes at least one "graphical function" which represents the optical response of a graphical pattern contained on the encoder disc, or the combined responses of the graphical pattern and a mask aperture. It is to be understood that the optical function may include other graphical functions attributable to other elements in the encoder's optical path. The term "graphical function" is further defined below.

Referring again to FIG. 1, encoder disc 30 and mask 36 are both optically programmed in that their optically responsive features (e.g., cycles 34 and aperture 38) are positioned, configured and dimensioned in accordance with a graphical function. The term "graphical function," for the purposes of this application, includes without limitation: mathematically defined geometric, algebraic and dimensional functions; and empirically derived graphical representations which may or may not be mathematically definable.

In the preferred embodiment, the selected graphical function is a transform of an electrical waveform function. In motor control applications, an electrical waveform is specified for optimally driving the motor under expected load conditions. For example, a motor which is to drive a compressor in an air conditioner, will experience a non-uniform load condition for every turn of the motor shaft. In such case, a corresponding non-uniform waveform for the drive signal may be optimally specified. An example of such a waveform is shown in FIG. 8B. Once an optimum waveform function is identified, its graphical or algebraic equivalent can be derived by using algebraic area-fill equations (described hereinbelow). In encoder 22, the graphical function is physically realized by the combined optical effect of graphical pattern 32 and aperture 38, as encoder disc 30 rotates with motor shaft 18, causing pattern 32 to scan by aperture 38.

Radiant energy from emitter 24 is directed along optical path 28 until it becomes incident upon the photo-responsive surface of detector 26. The incident radiant energy forms a pattern on the photo-responsive surface of detector 26. This surface is illustrated in FIG. 2, and identified by reference numeral 46. The pattern of incident radiant energy may be bounded by the entire dimensions of surface 46. However, it is preferred that aperture 38 define the maximum dimensions of the pattern. As shown in FIG. 2 (for illustrative purposes only), aperture 38 has defined a restricted area 48. It is to be understood that area 48 can be configured in any shape in accordance with a desired graphical function.

The combined optical effect of disc 30 and mask 36 can be understood with further reference to FIG. 2. Within area 48, an unshaded region 50 represents the instantaneous pattern of incident radiant energy on surface 46. A shaded region 52 represents the absence of radiant energy within bounded area 48. In a reflective encoder system, regions 50 and 52 would represent varying degrees of intensity of the incident radiant energy in a complex interference pattern.

To aid in the description, an x, y coordinate system has been drawn on surface 46. For a given instant in time, the pattern of incident radiant energy 50 is defined by a particular graphic shape in the x, y coordinate domain. As understood from FIG. 2, pattern 50 will vary in a number of different directions, in two dimensional space. As graphical pattern 32 scans by aperture 38, incident radiant energy pattern 50 is modified or re-shaped in a plurality of directions. The arrows in FIG. 2 schematically illustrate the directions in which the pattern may be modified. The incident pattern 50 is modified in accordance with the defined graphical function which, in this case, is realized by graphical pattern 32 scanning by aperture 38.

Photo-transistor 26 is responsive to the instantaneous radiant energy pattern 50, and generates an electrical signal that is proportional to the quantity of radiant energy represented in pattern 50. Detector 26 is characterized by a photo-electric response which, when linear, generates an electrical signal having a waveform that matches the waveform function originally specified. The photo-electric response does not have to be linear. In fact, the response can be used as an additional programmable design parameter to produce a desired waveform. In this embodiment, the product of the photo-electric response of detector 26 and the specified waveform function will define the electrical signal waveform produced at the output of detector 26.

Referring now to FIG. 3, there is shown a three-channel implementation of the optical encoder of the present invention. The encoder is employed here to drive a three-phase, three pole-pair, A.C. induction motor 100. Motor 100 has a stator assembly 102 and a rotor assembly 104. The construction of the motor is conventional and will not be described in great detail. Stator assembly 102 includes three winding pairs 106a and 106b for each phase (only one pair is shown for each phase). Motor 100 has three A.C. input terminals A, B and C for the respective three-phase input signals. Each pair of windings 106a, 106b induces a pole pair in rotor 104 (i.e., three pole pairs for each phase). In the schematic view of FIG. 3, each pole pair (N-S) shown in rotor 104 represents three actual pole pairs.

As shown in FIG. 3, a three-channel encoder 110 is coupled to a rotor shaft 108 of motor 100, and is mechanically aligned with a rotational axis 112 of shaft 108 in the same manner as described with respect to encoder 22 of FIG. 1. Encoder 110 includes three infrared LED emitters 114a–c. Emitters 114a–c emit infrared energy along respective optical paths defined between emitters 114a–c and a corresponding number of photo-transistors 116a–c. Encoder 110 includes a multi-track optical encoder disc 118, configured to rotate about a central axis 119. Disc 118 contains three coaxially disposed, optically detectable graphical patterns 120a–c. Encoder 110 further includes a mask 122, shaped in the form of a disc, containing three apertures 124a–c. As with encoder 22 of FIG. 1, mask 122 is held stationary while encoder disc 118 is made to rotate by the rotating motion of shaft 108. Mask apertures 124a–c and graphical patterns 120a–c are aligned respectively to the optical paths, in the same manner as described for encoder 22 of FIG. 1.

As shown in FIG. 3, three potentiometers 126a–c are electrically connected between a voltage supply Vcc and ground. The output leads of detectors 116a–c are connected to the adjustable wipers of potentiometers 126a–c, respectively. The adjustable wipers of pots 126a–c are connected to the inputs of respective power amplifiers 128a–c. The low voltage output signals of detectors 116a–c are amplified to levels sufficient to directly drive motor 100, as described with respect to the implementation of FIG. 1. Outputs A, B and C of amplifiers 128a–c are directly connected to inputs A, B and C of motor 100. Encoder 110 generates the electrical signal outputs in the same manner described with reference to FIGS. 1 and 2.

The relative phases of the output signals of detectors 116a–c are determined by the positions of graphical patterns 120a–c relative to their respective apertures 124a–c, at a particular angle of rotation of shaft 108. In FIG. 3, the output signals of encoder 110 should have relative phases of 0, 120, and 240 electrical degrees to properly drive motor 100. This phase relationship can be established by rotating the position of each graphical pattern by a number of physical degrees equal to the desired electrical degree phase shift (e.g., 120 or 240 electrical degrees) divided by the number of graphic cycles in the graphical pattern.

For the embodiment of FIG. 3, the position of pattern 120b is rotated by 40 physical degrees relative to pattern 120c to produce the desired 120 electrical degree phase shift. Similarly, the position of pattern 120a is rotated 80 physical degrees relative to pattern 120c to produce the desired 240 electrical degree phase shift. In FIG. 3, the angular positions of apertures 124a–c are aligned, and thus do not contribute to the shift in phase. Other multi-channel phase shift examples are described herein below with reference to FIGS. 12A–C and 13A–C.

The design of the optical encoder of the present invention will now be explained with reference to two motor control examples. It is to be understood that this design process is equally applicable to other types of encoders in which graphically shaped patterns or areas can be utilized. First, consider a synchronous example involving a single phase A.C. motor, having three pole pairs, such as in FIG. 1. At synchronous speed, this motor revolves at 1200 RPM or 20

RPS (revolutions per second). The motor, to turn at synchronous speed, requires 60 Hz and 120 Volts. This frequency is created by an optically programmed encoder disc and mask combination, with the encoder disc being directly coupled to the rotor shaft of the motor. The optically detectable graphical pattern contained on the encoder disc must include three graphic cycles to produce three corresponding electrical waveform cycles per revolution of the rotor shaft. Such an arrangement is shown in FIG. 4A for a sinusoidal waveform.

Figure 4A:
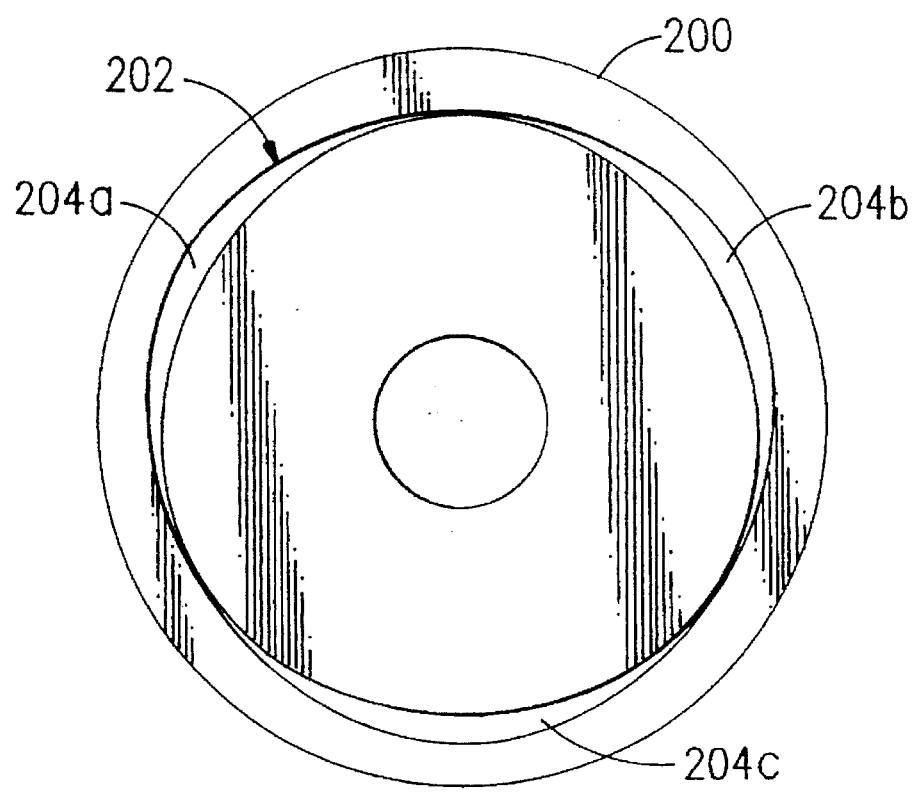
FIGS. 4A-B show, respectively, an optical encoder disc configured in accordance with the present invention having a graphical pattern for generating a sinusoidal waveform, and the corresponding waveform function.
Figure 4B:
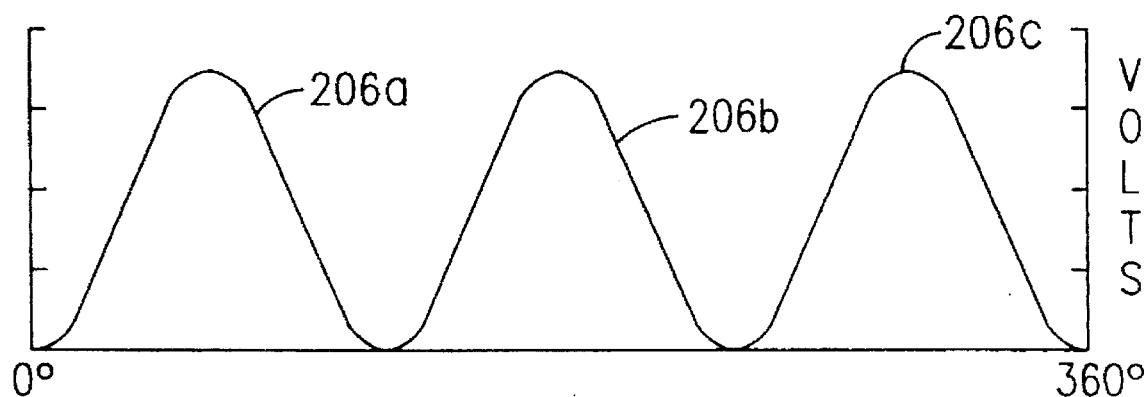
Figure 6:
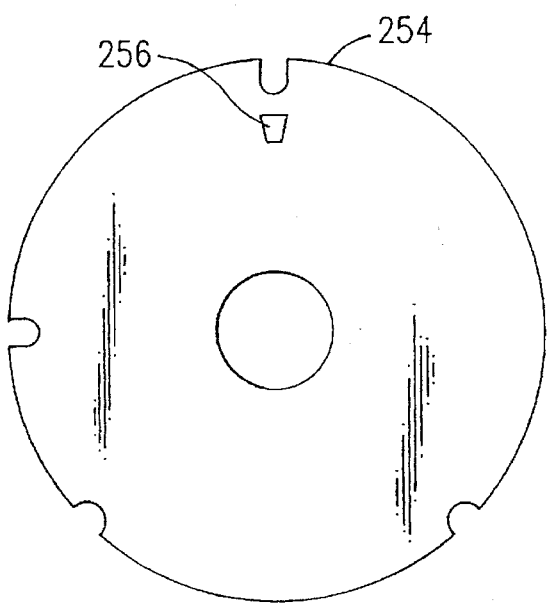
FIG. 6 is a top plan view of a mask configured in accordance with the present invention, used with the encoder discs of FIGS. 4A, 5A and 7A, to produce signals having waveforms corresponding to the waveform functions of FIGS. 4B, 5B and 7B.

In FIG. 4A an encoder disc 200 contains a graphical pattern 202 which includes three graphic cycles 204a–c. The mask aperture used With disc 200 is shown in FIG. 6. When disc 200 is turning at 20 RPS, a 60 Hz sinusoidal A.C. signal is produced by the encoder (20 RPS times 3 electrical cycles per revolution). As shown in FIG. 4B, one revolution of encoder disc 200 (0°–360°) will produce three electrical cycles 206a–c. This is the desired waveform function for the example.

Graphical pattern 202 of encoder disc 200, and the mask aperture shown in FIG. 6, are created, first, by expressing the desired waveform function in the form of a vector data table. In this sinusoidal example, the vector table values are arrived at using the expression y=sin (electrical degrees)

There are three complete electrical cycles expressed over 360 mechanical degrees (one physical revolution). Therefore, there are 1080 electrical degrees over one revolution of the disc. The vector data can be plotted to give visual feedback as to how the final waveform will look. (FIG. 4B represents both the plotted input waveform and the resultant photo-transistor electrical output.)

The next step is to determine the shape of graphic cycles 204a–c in optical pattern 202. This is accomplished by using algebraic area-fill equations. The vector values computed from the above equation are inserted into the following equations:

$$V_{n \to p} = \frac{(W_{n+1} - W_n) * v/8 + V_{n-m}}{64} * 2$$

Where:

V=Disc area fill vector

W=Waveform point, originating in waveform input file p=Number of points in waveform input file $m_i$=Mask width, input parameter m=Mask width, scaled n=1, 2, 3, ... p v=Vector scale factor, input parameter The expressions $(W_{n+1}-W_n)*v/8$, and $V_{n-m}$, assume the value of zero if the respective calculated results are negative.

The mask aperture shape is adapted for proper attenuation of the optical signal. In this example, the equation is $m=m_i$, If $p/2 > m_i$ $m=p/2$, If $p/2 < m_i$ Where:

p=Number of points in waveform input file $m_i$=Mask width, input parameter m=Mask width, scaled and $m_i>=2$.

The above equations are only examples for an X, Y area fill for horizontal motion of the disc pattern relative to mask.

For rotational motion, polar values are used. It is understood that there are numerous equations, algorithms or other methods to arrive at a suitable disc/mask combination to create the necessary optically produced waveform. In the final step, the disc and mask are printed in accordance with the algebraic area-fill values obtained from the above equations (fitted to radial vs horizontal motion).

These same area-fill values may be used to configure (or shape) other types of responsive encoder elements such as, for example, reflective surfaces or patterns, capacitive plates, magnetic strips, etc.

Now consider a non-synchronous example. First, determine from the frequency and normal operating speed of the motor, how many cycles it needs per revolution. For example, if you have a 60 Hz motor with a normal operating speed of 1,050 RPM's, you need 3.428 electrical cycles per revolution at 120 Volts A.C. After you have determined the number of electrical cycles needed, and find that it is a non-integer number, you round this number up to the next nearest whole cycle, or up a few more whole cycles. For example, if the motor requires 3.428 electrical cycles per revolution, then four cycles (or five or six cycles) per revolution may be selected to design the encoder disc. (This method of rounding up to the next whole integer cycle is an option if a lower drive voltage is preferred for given speeds).

In a next step, this higher number of cycles per revolution is optically programmed on the encoder disc using the area fill equations described above. The programmed disc, when installed on the motor under load, may produce a signal that runs the motor (after direct amplification) at a higher speed than its normal operating speed at 120 Volts A.C., because of the greater number of cycles per revolution. In such a case, the performance of the motor will be improved (i.e., a higher speed is achieved at the same load and input power). By lowering the voltage input to the motor, the motor and encoder disc slow down to a normal operating speed of 60 Hz. The motor is driven at its normal operating speed (60 Hz) with less than the specified voltage (120 VAC), thus reducing the amount of energy needed to run the motor for the same load. If the load required more energy (i.e., the motor did not speed up), then there would be no need to lower the voltage, as the encoder did not exceed a speed of 60 Hz, so that the input energy would match the more demanding load.

Figure 28:
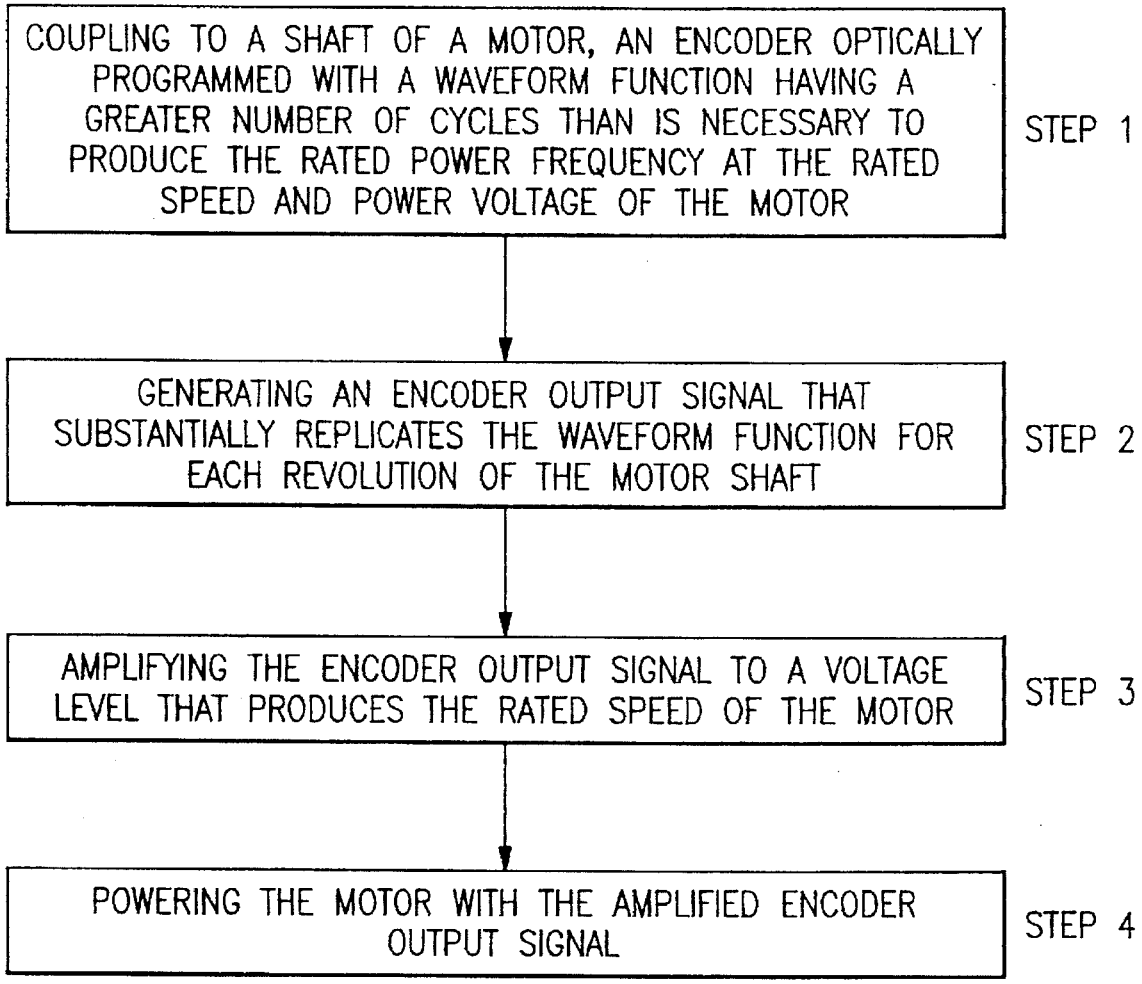
FIG. 28 is a flow diagram, outlining the preferred embodiment of a method of the present invention.

FIG. 28 shows a flow diagram outlining one embodiment of the above-described method of operating a motor. This method is applicable whether or not a non-integer number of cycles is computed for the rated speed, frequency and voltage of the motor. In Step 1, an optical encoder of the present invention is coupled to a shaft of a motor. The encoder is optically programmed with a waveform function having a greater number of electrical cycles than is necessary to produce the rated power frequency at the rated speed and power voltage of the motor. In Step 2, an encoder output signal, that substantially replicates the waveform function, is generated for each revolution of the motor shaft. In Step 3, the encoder output signal is amplified to a voltage level that produces the rated speed of the motor. Finally, in Step 4, the motor is powered with the amplified encoder output signal. Further, in accordance with this method, the voltage level of the encoder output signal can be varied to vary the speed of the motor and thus vary the frequency of the encoder signal to a specified number.

In both the synchronous and non-synchronous examples described above, once the encoder speed is calibrated to the motor operating frequency, the speed of the motor can be controlled by merely adjusting the voltage input to the motor, and the calibrated encoder will ensure that the speed is always matched to the frequency.

Figure 5A:
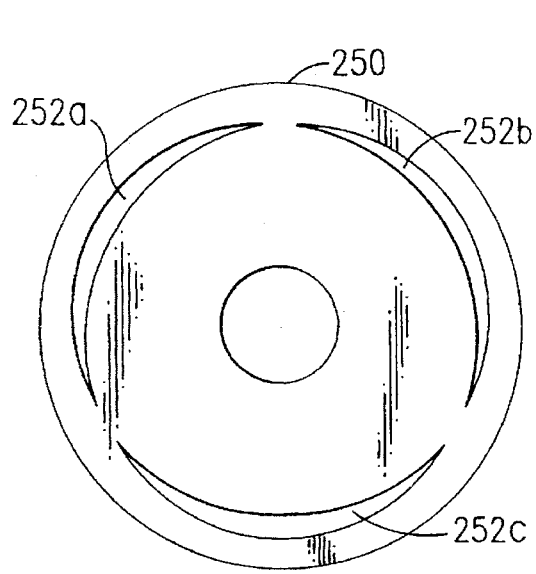
FIGS. 5A-C show, respectively, an optical encoder disc of the present invention having a graphical pattern for generating a trapezoidal waveform, the corresponding waveform function, and an equivalent linear representation (X-Y) of the circular graphical pattern of FIG. 5A and corresponding mask aperture.
Figure 5B:
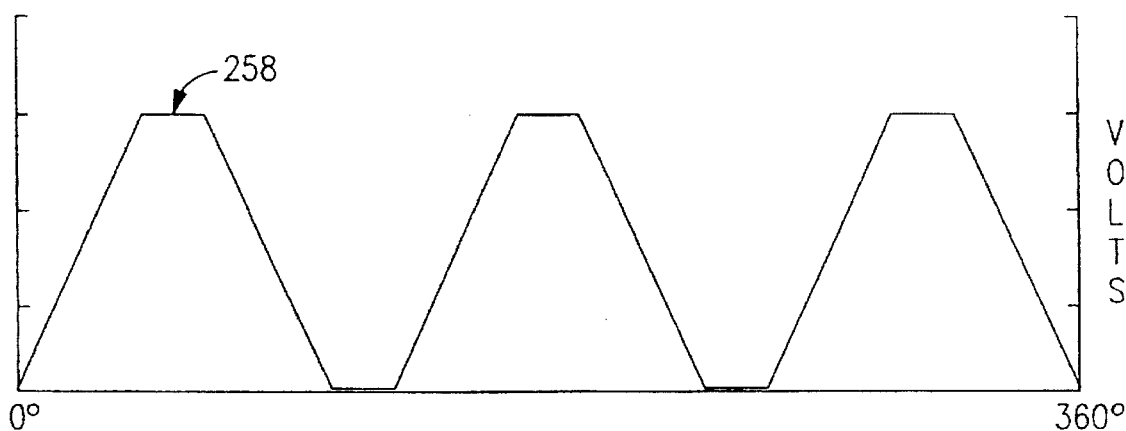
Figure 5C:
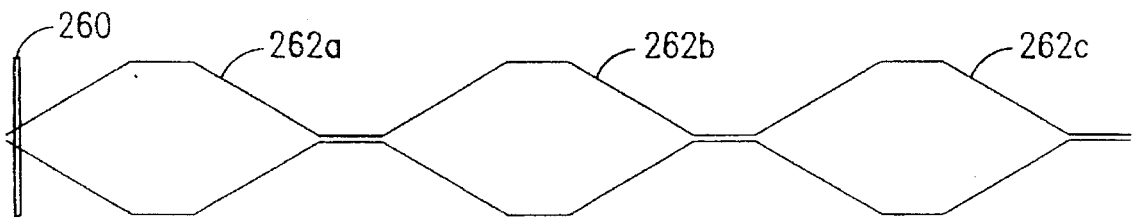

Some examples of encoder discs, and the waveform functions used to graphically encode the discs are shown in FIGS. 4A–B, 5A–C, 7A–C, 8A–C, 9, 10, 11A–F, 12A–C, and 13A–C. In FIG. 5A, an encoder disc 250 contains a graphical pattern comprising three graphic cycles 252a–c. In this example, graphic cycles 252a–c are transparent optical windows. FIG. 6 shows a mask 254 containing a mask aperture 256 which is intended to be used with disc 250. A waveform function 258 is shown in FIG. 5B, and is used to determine the shapes of cycles 252a–c and mask aperture 256. Waveform function 258 also represents the actual electrical signal output of the encoder. An equivalent linear representation (X-Y) of graphic cycles 252a–c and mask aperture 256 are shown in FIG. 5C. A mask aperture 260 corresponds to aperture 256, and cycles 262a–c correspond to cycles 252a–c.

Figure 7A:
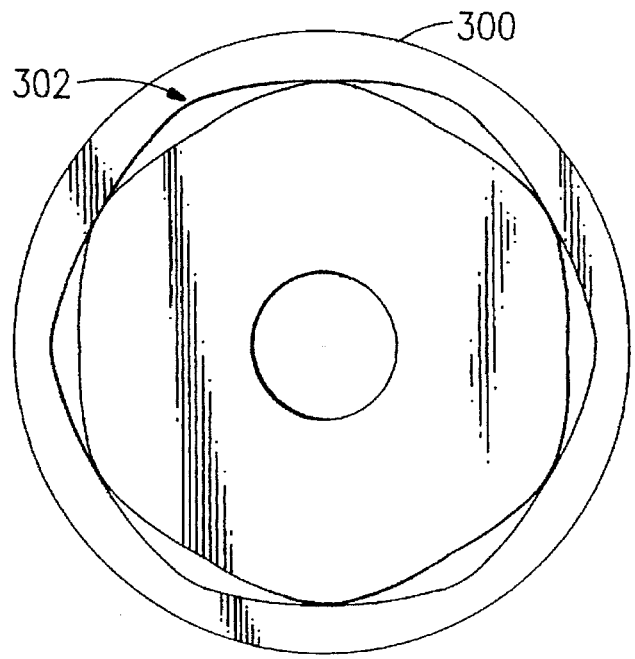
FIGS. 7A-C show, respectively, an optical encoder disc of the present invention having a graphical pattern for generating a sinusoidal waveform, the corresponding waveform function, and an equivalent linear representation (X-Y) of the circular graphical pattern of FIG. 7A and corresponding mask aperture.
Figure 7B:
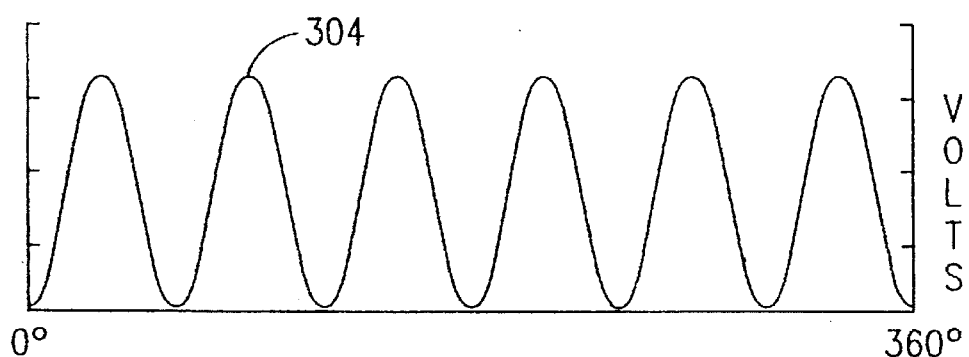
Figure 7C:
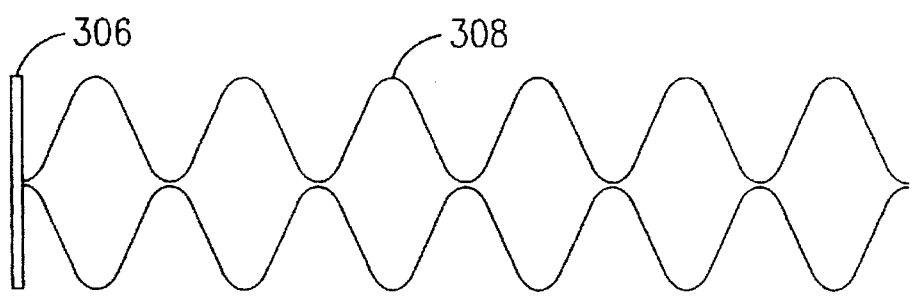

FIGS. 7A–C illustrate another sinusoidal example, where six electrical cycles for each revolution of the encoder disc are desired. In FIG. 7A, an encoder 300 contains a graphical pattern 302 comprising six graphic cycles. The graphic cycles are transparent optical windows. In this example, mask aperture 256 (FIG. 6) is used with disc 300. A waveform function 304 is shown in FIG. 7B, and is used to determine the shapes of pattern 302 and mask aperture 256. Waveform function 304 also represents the actual electrical signal output of the encoder. An equivalent linear representation (X-Y) of graphical pattern 302 and mask aperture 256 is shown in FIG. 7C. A mask aperture 306 corresponds to aperture 256, and a graphical pattern 308 corresponds to pattern 302. Further mask aperture examples of other geometric shapes are shown FIGS. 12B, 13B, 14B and 15B.

Figure 8A:
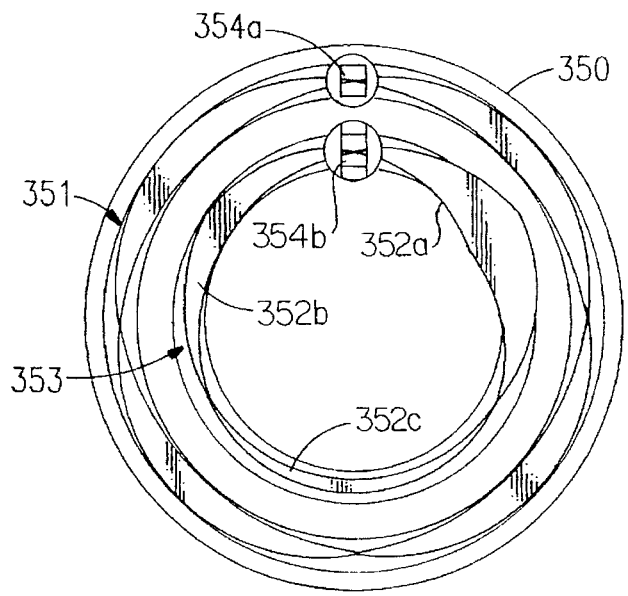
FIGS. 8A-C show, respectively, another optical encoder disc of the present invention having a uniform and a non-uniform graphical pattern, a waveform function corresponding to the non-uniform pattern, and an equivalent linear representation (X-Y) of the non-uniform graphical pattern shown in FIG. 8A and the corresponding mask aperture.
Figure 8B:
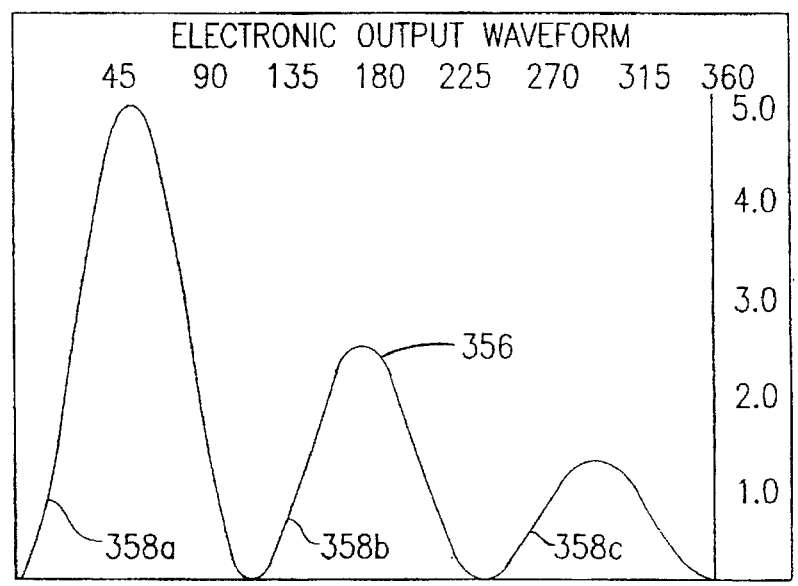
Figure 8C:
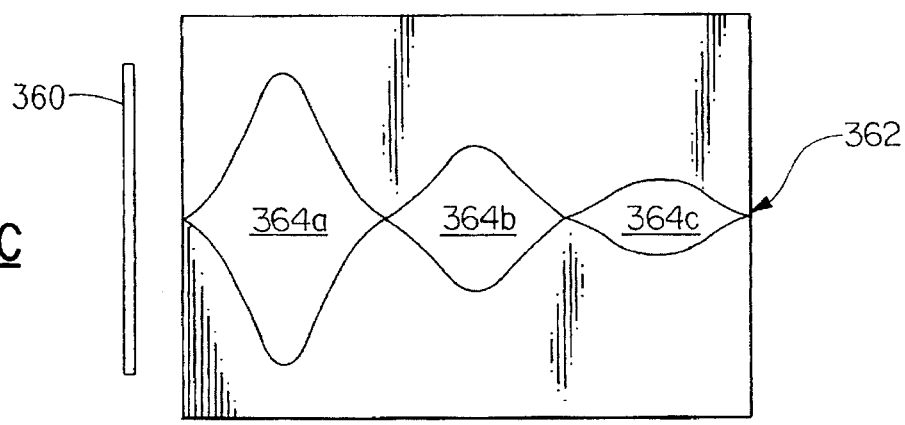

FIGS. 8A–C illustrate a non-uniform waveform example. In FIG. 8A, a transparent encoder disc 350 contains an uniform graphical pattern 351 and a non-uniform graphical pattern 353. Graphical pattern 351 contains four uniform graphic cycles, and pattern 353 contains three non-uniform graphic cycles 352a–c, as shown. The graphic cycles of pattern 351 and cycles 352a–c of pattern 353 are opaque optical reticles, printed on transparent encoder disc 350 ("opaque on clear"). FIG. 8A also shows a pair of mask apertures 354a and 354b, configured and dimensioned to be used with patterns 351 and 353 respectively. Graphical pattern 351 is not used in this example. As understood from FIGS. 8A and 8B, the non-uniform sizes of cycles 252a–c correspond to the non-uniform sizes of electrical cycles 358a–c respectively, of a predetermined waveform 356. Waveform 356 represents the waveform function used to determine the shapes of graphic cycles 352a–c and mask aperture 354b. Waveform function 356 also represents the shape of the encoder output signal needed, for example, to drive a variable motor load. An equivalent linear representation (X-Y) of graphical pattern 353 and mask aperture 354b is shown in FIG. 8C. As shown in FIG. 8C, a mask aperture 360 corresponds to aperture 354b, a graphical pattern 362 corresponds to pattern 353, and graphic cycles 364a–c correspond to cycles 352a–c.

Figure 9:
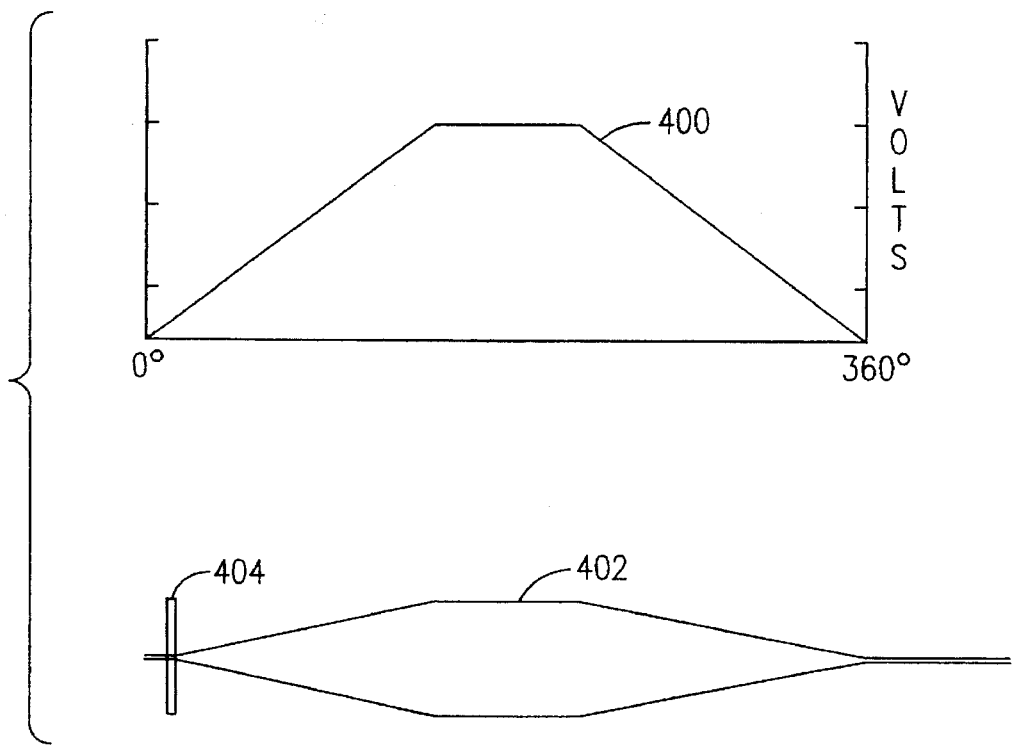
FIG. 9 shows, respectively, a trapezoidal waveform function having one electrical cycle, and corresponding encoder mask and disc configurations.
Figure 10:
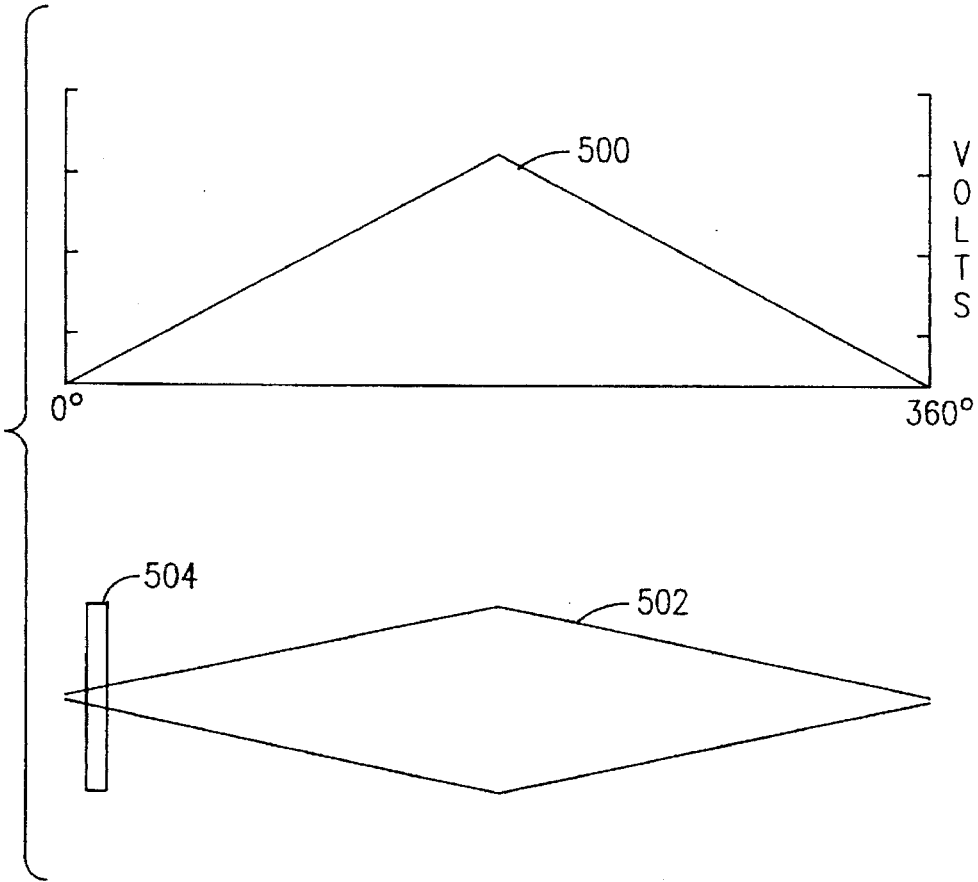
FIG. 10 shows, respectively, a triangular waveform function having one electrical cycle, and corresponding encoder mask and disc configurations.

Further examples of waveform functions, and corresponding encoded discs and masks, are shown in FIGS. 9, 10 and 11A–F. In FIG. 9, a trapezoidal waveform function 400 is shown having one electrical cycle per physical cycle of motion (e.g., one 360° revolution). The shape of a graphical pattern 402 and a mask aperture 404 are determined from waveform function 400. Also, in FIG. 10 a triangular waveform function 500 is shown having one electrical cycle per revolution. The shape of a graphical pattern 502 and a mask aperture 504 are determined from waveform function 500.

Figure 11A:
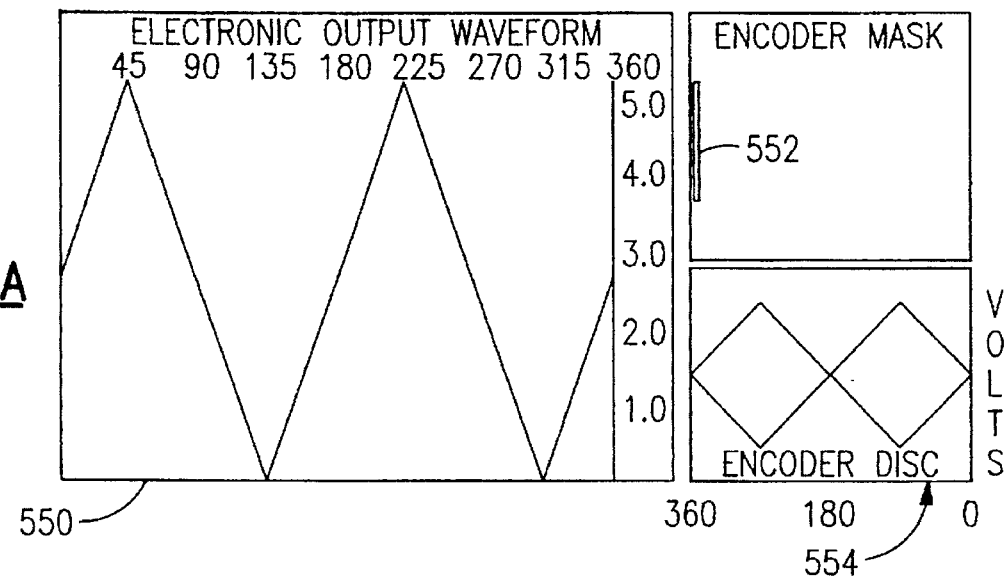
FIGS. 11A-F each show, respectively, a particular waveform function, and corresponding encoder mask and encoder disc configurations computed by algebraic area-fill equations.
Figure 11B:
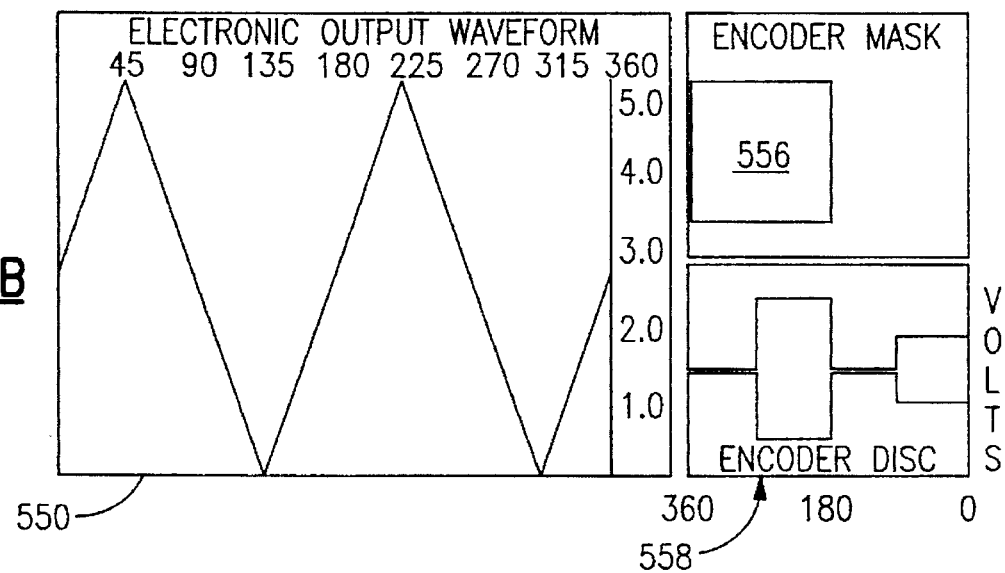

Referring now to FIGS. 11A–F, particular waveform functions, and corresponding encoder mask and encoder disc configurations, are shown. The encoder mask and disc configurations were computed by the algebraic area fill equations described above. FIGS. 11A and 11B demonstrate that a particular triangular waveform 550 can be produced by two entirely different mask and disc graphics. As shown in FIG. 11A, a mask aperture 552 is used with a graphical pattern 554 to produce triangular waveform 550. In FIG. 11B, a mask aperture 556 is used with a graphical pattern 558 to produce the same triangular waveform 550.

Figure 11C:
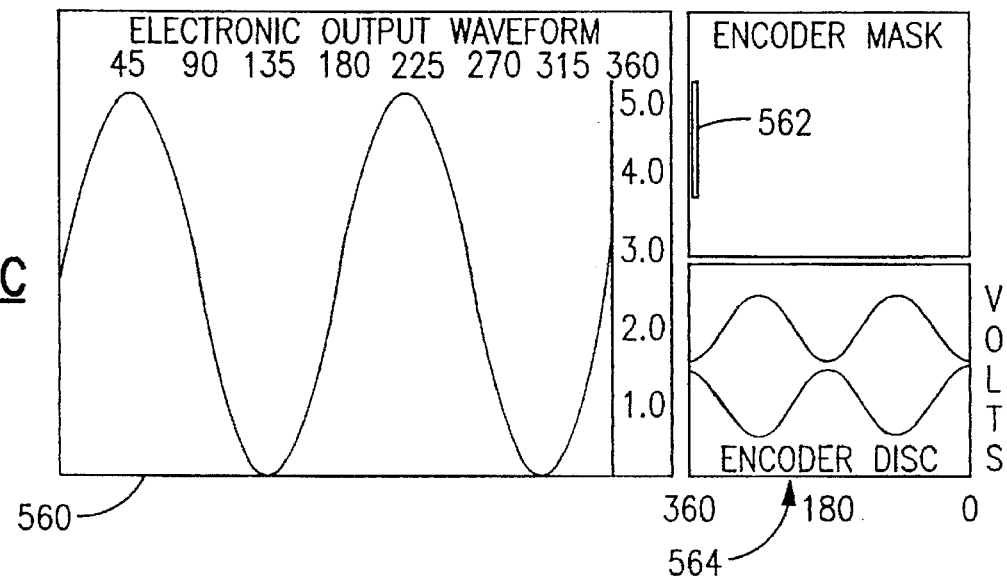
Figure 11D:
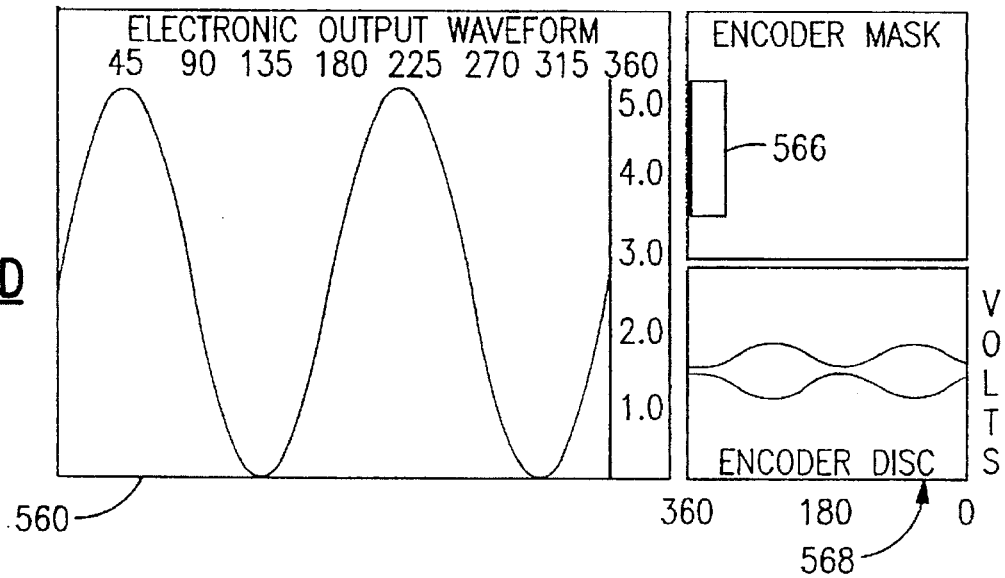

Similarly, FIGS. 11C and 11D show that a particular sinusoidal waveform 560 can be produced by two different mask and disc graphics. In FIG. 11C, a mask aperture 562 is used with a graphical pattern 564 to produce sinusoidal waveform 560. In FIG. 11D, a mask aperture 566 is used with a graphical pattern 568 to produce the same waveform 560.

Figure 11E:
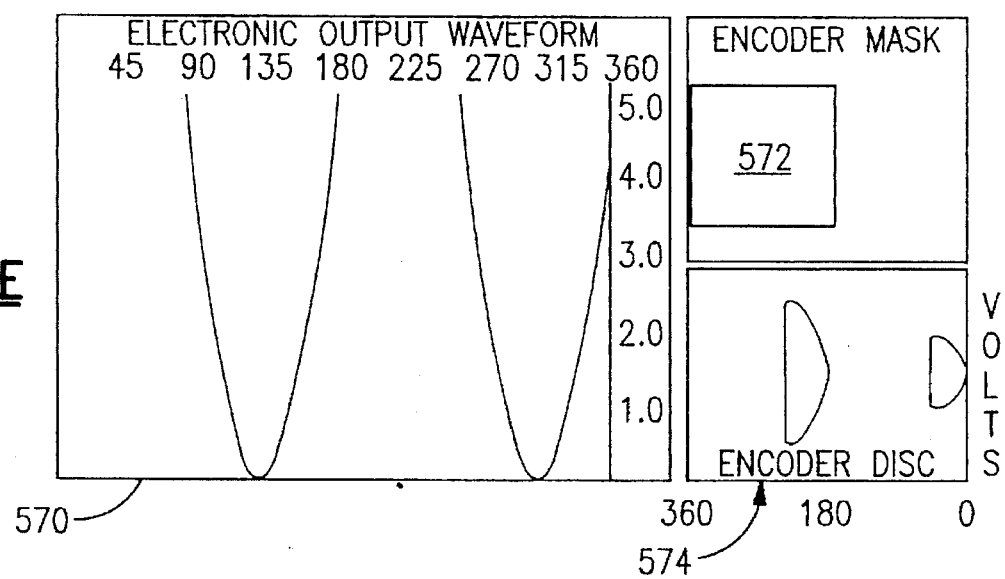
Figure 11F:
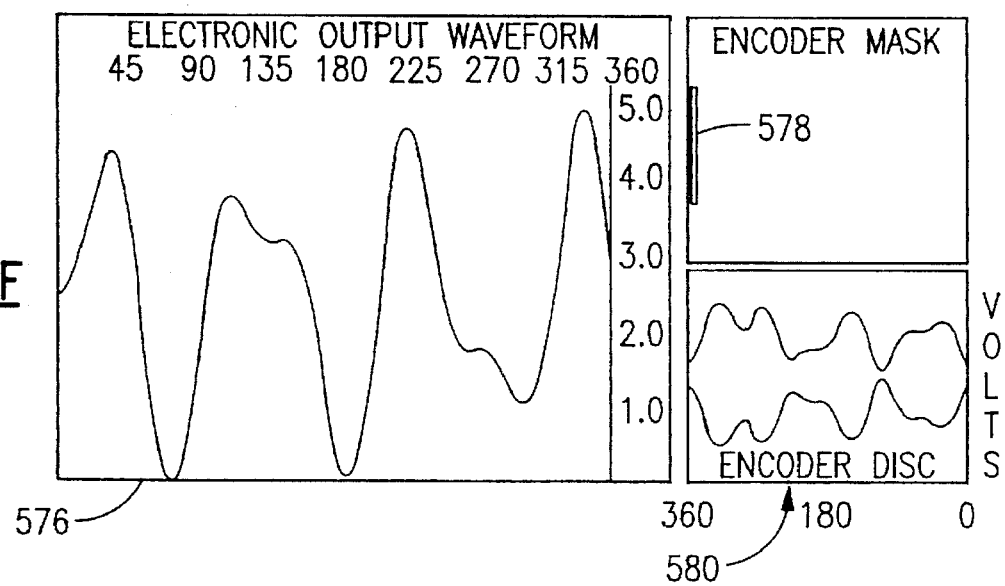

FIGS. 11E and 11F show still other mask and disc graphic combinations that create still other desired waveforms. In FIG. 11E, a bottom-rounded trapezoidal waveform 570 is produced with a mask aperture 572 and a graphical pattern 574. In FIG. 11F, a complex waveform 576 is produced with a mask aperture 578 and a graphical pattern 580.

Figure 12B:
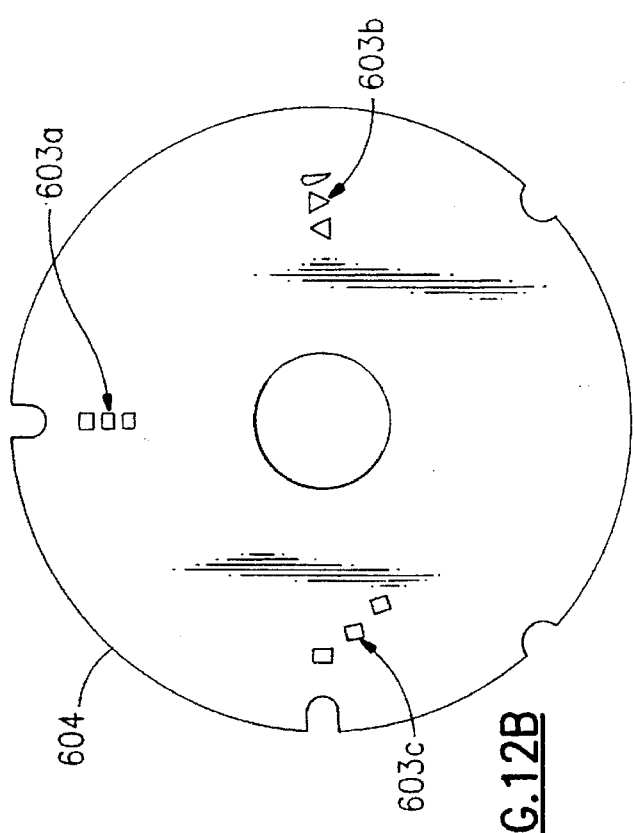
FIGS. 12A-C show, respectively, an optical encoder disc of the present invention having three graphical patterns which are physically shifted angularly, 0, 40 and 80 degrees respectively to generate three signals that are phase-shifted 0, 120 and 240 electrical degrees respectively, an encoder mask to be used with the encoder disc of FIG. 12A, and three phase-shifted waveform functions corresponding to the graphical patterns of FIG. 12A.
Figure 12A:
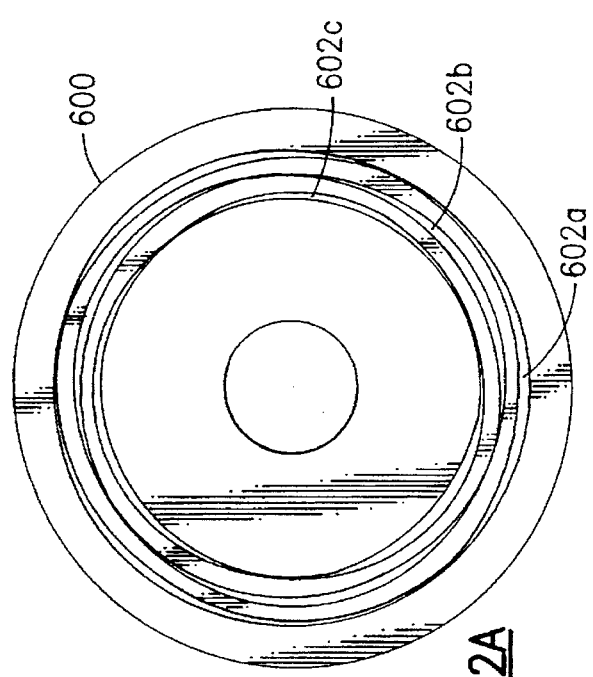
Figure 12C:
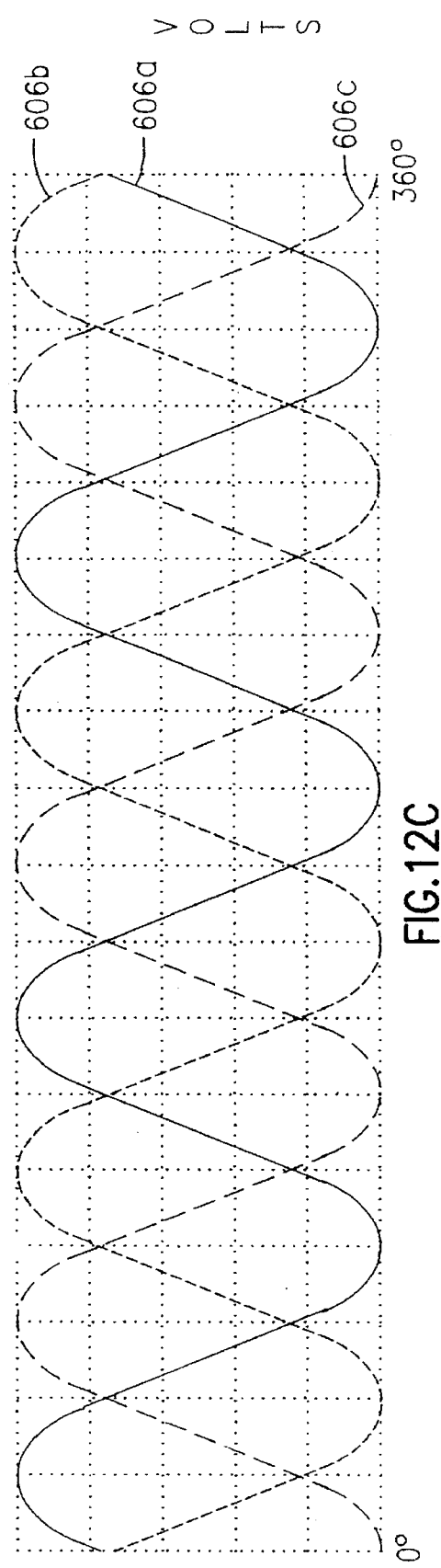

Referring now to FIGS. 12A–C, a three-phase encoder example is shown. As shown in FIG. 12A, a circular encoder disc 600 contains three coaxially disposed and angularly shifted graphical patterns 602a–c. In this example, patterns 602a–c each contain three identical graphic cycles to produce three uniform electrical cycles per revolution of a motor shaft. It is to be understood that the graphical patterns can be configured in many different ways, as illustrated in FIGS. 8, 9, 10, and 11A–F.

Each graphical pattern 602a–c is disposed along a circular track of 360 physical degrees on disc 600. Each graphic cycle in each pattern corresponds to 360 electrical degrees in the associated waveform function. With three uniform graphic cycles per pattern, each of the patterns 602a–c represents 360 electrical degrees times 3, which equals 1080 electrical degrees. Therefore, to effect a desired electrical phase shift in a waveform, one must angularly shift the corresponding graphical pattern by a number of physical degrees, which equals the desired electrical phase shift (in electrical degrees) divided by the number of graphic cycles in the graphical pattern. Accordingly, in this example, if a 120° phase shift is desired, the graphical pattern would have to be angularly shifted in position, 120°/3 cycles=40 physical degrees.

Referring to FIG. 12A, pattern 602b is angularly shifted relative to pattern 602c by 40°, to effect a phase shift of 120°. Pattern 602a is angularly shifted relative to pattern 602c by 80°, to effect a phase shift of 240°. As shown in FIG. 12B, a mask 604 contains three sets of mask apertures 603a–c. The apertures in set 603a are radially aligned with each other, and spaced to align with respective patterns 602a–c. FIG. 12C is a plot of the phase shifted waveform functions used to produced patterns 602a–c, which also represent the phase shifted electrical signal outputs of the encoder. Waveform 606a is shifted 240 electrical degrees from waveform 606c, and waveform 606b is shifted 120 electrical degrees from 606c.

Figure 13B:
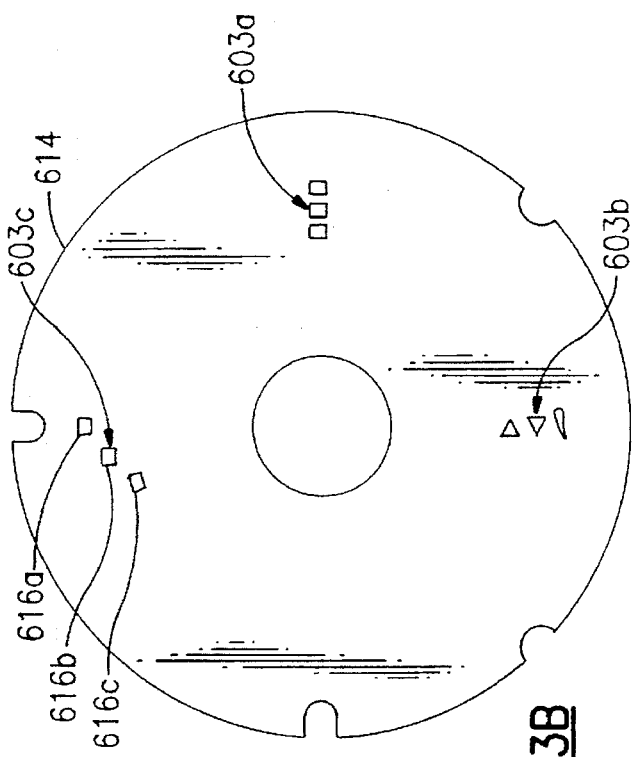
FIGS. 13A-C show, respectively, an optical encoder disc of the present invention having three graphical patterns which are angularly shifted 0, 40 and 80 physical degrees respectively, an encoder mask to be used with the encoder disc of FIG. 13A having apertures angularly shifted 0, −10, and −20 physical degrees, and three corresponding waveform functions phase-shifted 0, 90, and 180 electrical degrees.
Figure 13A:
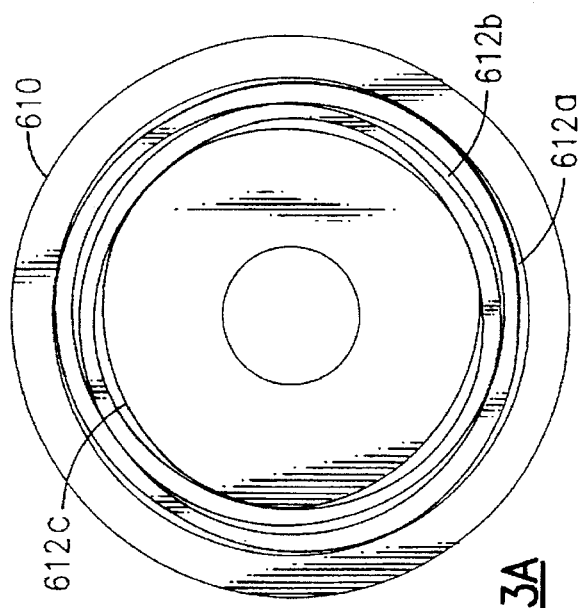
Figure 13C:
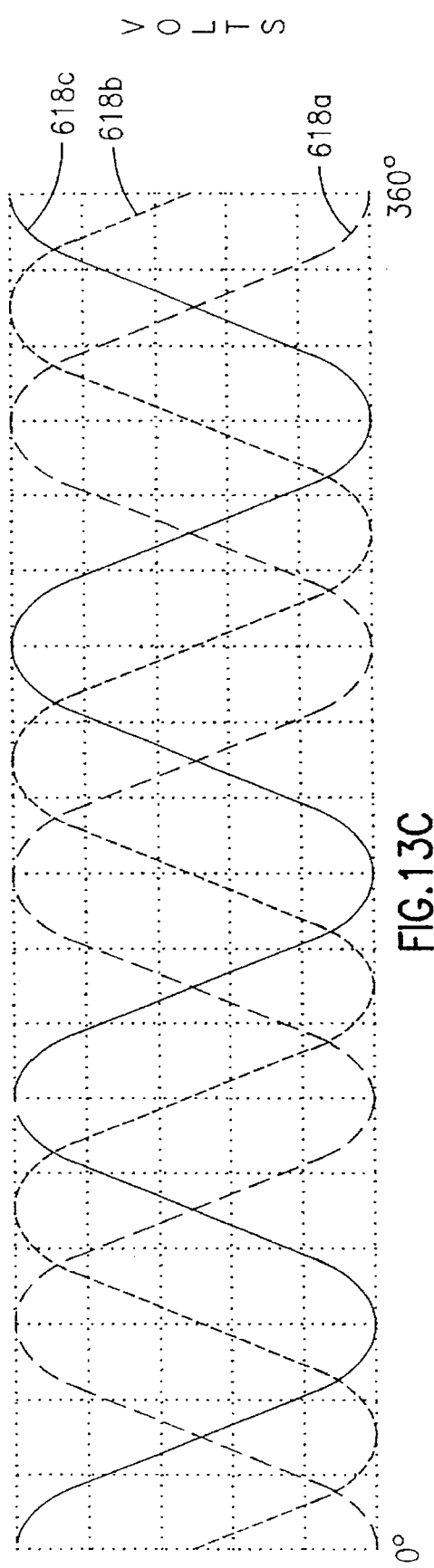

Another three-phase example is shown in FIGS. 13A–C. As shown in FIG. 13A, an encoder disc 610 contains three graphical patterns 612a–c which are identical to those contained on encoder disc 600 (FIG. 12A). In this example, phase shifted waveforms of 0°, 90° and 180° are required. Using the same encoder disc, this different set of phase shifts can be obtained if mask 604 (FIG. 12B) is changed or physically rotated to utilize aperture set 603c. As shown in FIG. 13B, a mask 614 is identical to mask 604, but has been rotated clockwise by 90 physical degrees. Aperture set 603c on mask 614 contains three apertures 616a–c, which are angularly shifted 0°, –10° and –20° respectively.

Aperture 616b lags aperture 616a by 10 physical degrees which, in this case, corresponds to –30 electrical degrees of phase shift. The –30° of phase shift is added to the +120° of phase shift attributable to pattern 612b (FIG. 13A) to obtain the desired 90° phase shift. Aperture 616c lags aperture 616a by 20 physical degrees which corresponds to –60 electrical degrees of phase shift. The –60° of phase shift is added to the +240° of phase shift attributable to pattern 612c (FIG. 13A) to obtain the desired 180° degrees phase shift. Aperture 616a does not contribute any phase shift, and thus pattern 612a produces the desired 0° phase shift.

FIG. 13C shows the phase shifted waveform functions corresponding to graphical patterns 612a–c and aperture set 603c (FIGS. 13A and 13B). Waveform 618c corresponds to pattern 612c and aperture 616c, and is shifted 180 electrical degrees from waveform 618a; waveform 618b corresponds to pattern 612b and aperture 616b, and is shifted 90 electrical degrees from waveform 618a; and waveform 618a corresponds to pattern 612a and aperture 616a.

It has been illustrated that a mask can be multi-functional, containing a number of different aperture sets, each one of which can be selected for a particular application. For example, aperture sets 603a–c of FIGS. 12B and 13B allow a single encoder to produce different sets of phase shifted signals, as demonstrated in FIGS. 12C and 13C. Each of the sets of signals can be selected, by manually adjusting the position of the mask aperture sets 603a–c, by electronic switching between two sets of photo-transistors, or by outputting the signal from multiple sets of detectors.

Further examples illustrating how the mask can be configured with graphically shaped apertures is shown in FIGS. 14A–D and 15A–D. In FIG. 14A, an encoder disc 620 contains a graphical pattern of six equally spaced apertures 622 (60 degree physical spacing). Disc 620 is the rotating disc. FIG. 14B illustrates a mask 624 which is intended to be stationary. Mask 624 contains an elongated aperture 626 which is shaped according to the area-fill equations to generate a sinusoidal waveform. Behind mask 624, is an array of photo-detectors 628 which spans the entire aperture 626. Alternatively, a single, elongated photo-detector can be substituted for array 628. In the case of an array, the outputs of array 628 may be combined in different ways to produce a single waveform signal or a series of signal waveforms. As encoder disc 620 rotates relative to mask 624, each aperture 622 scans across aperture 626, producing a cycle in a sinusoidal waveform (if a single detector or a series-connected array of detectors are used). FIG. 14C shows a six cycle waveform function 630 corresponding to the encoder disc/mask arrangement of FIGS. 14A and 14B. FIG. 14D illustrates an equivalent linear representation (X-Y) of the encoder disc and mask arrangement of FIGS. 14A and 14B. Apertures 632 correspond to apertures 622 of encoder disc 620 in FIG. 14A, and aperture 634 corresponds to aperture 626 of mask 624 in FIG. 14B.

Figure 15A:
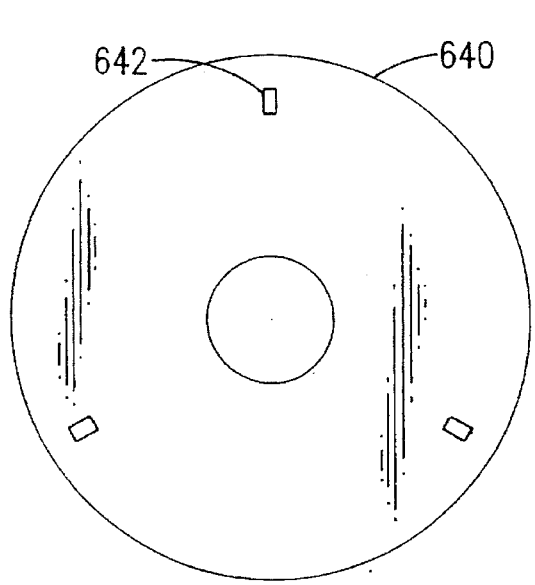
FIGS. 15A-D show, respectively, an optical encoder disc of the present invention having a graphical pattern comprising three apertures, a mask containing a pair of apertures which are graphically shaped for generating a sinusoidal waveform, the corresponding waveform function, and an equivalent linear representation (X-Y) of the graphical pattern of FIG. 15A and corresponding mask aperture.
Figure 15B:
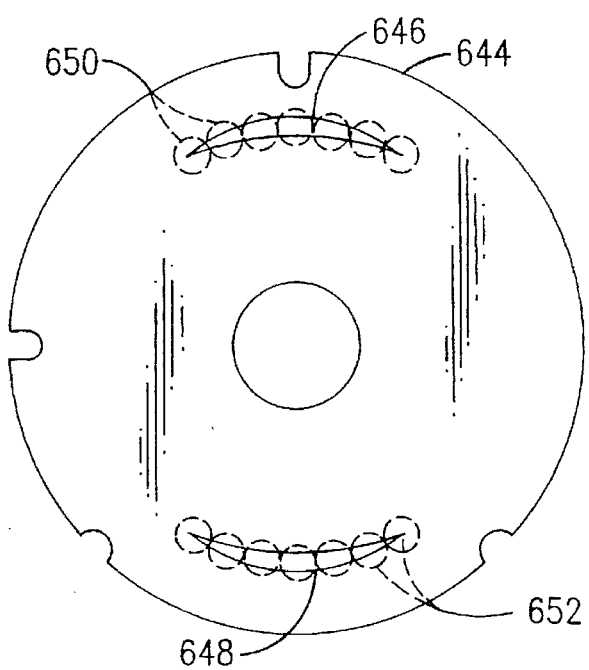
Figure 15C:
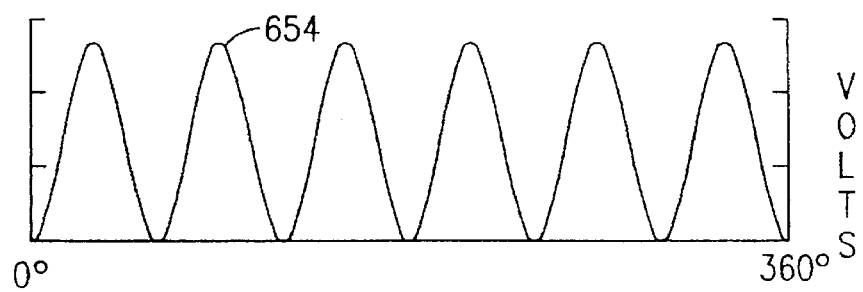
Figure 15D:
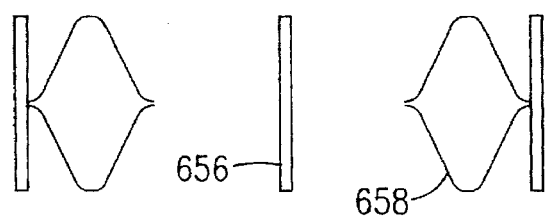

FIGS. 15A–D illustrates an equivalent arrangement to that of FIGS. 14A–D. In FIG. 15A, an encoder disc 640 contains a graphical pattern of three equally spaced apertures 642 (120° spacing). As shown in FIG. 15B, a mask 644 contains a pair of graphically shaped apertures 646 and 648, spaced 180° apart. Behind mask 644, is an array of photo-detectors 650 (or a single elongated detector) which spans the entire aperture 646, and the outputs of which may be tied together. Similarly, an array of photo-detectors 652 (or a single detector) is located behind aperture 648, and the outputs of array 652 may be tied together and to the combined output of array 650, to produce a single electrical signal output. FIG. 15C shows a six cycle waveform function 654 corresponding to the encoder disc/mask arrangement of FIGS. 15A–B. FIG. 15D illustrates an equivalent linear representation (X-Y) of the circular encoder disc and mask arrangement of FIGS. 15A–B. Apertures 656 correspond to apertures 642 of encoder disc 640 in FIG. 15A, and apertures 658 correspond to apertures 646 and 648 of mask 644 in FIG. 15B.

In those applications where it is desirable to produce a non-integer number of electrical cycles per revolution of the encoder disc, a certain graphic correction may be required to the graphical shapes produced by the area-fill equations. A graphical correction may also be required when creating the graphical shapes for a non-uniform waveform function such as shown in FIG. 17B. Correction may be required because a waveform function which is non-uniform or contains a non-integer number of cycles may produce a discontinuity each time it is repeated (i.e., each revolution of the encoder disc). FIGS. 16A–F illustrate the problem, and one approach to correcting for it.

Figure 16A:
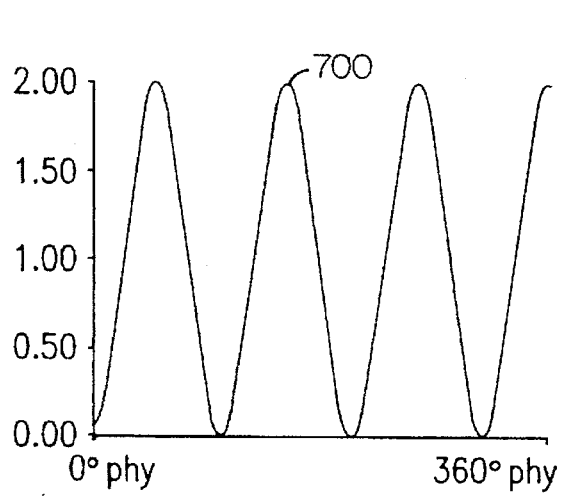
FIGS. 16A-F are waveform plots illustrating a method of graphically correcting for discontinuities in signals produced from non-integer waveform functions.
Figure 16B:
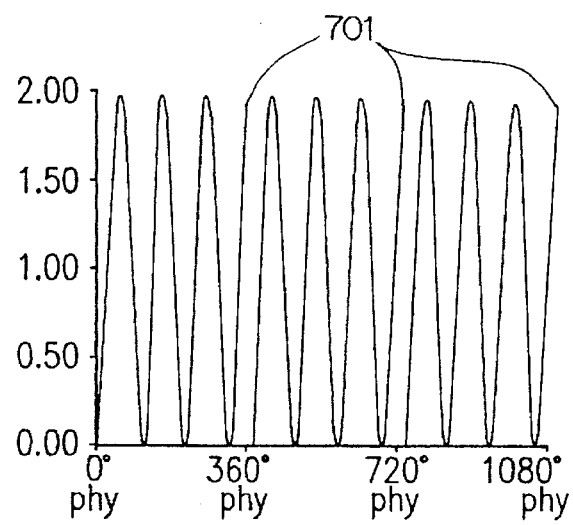
Figure 16C:
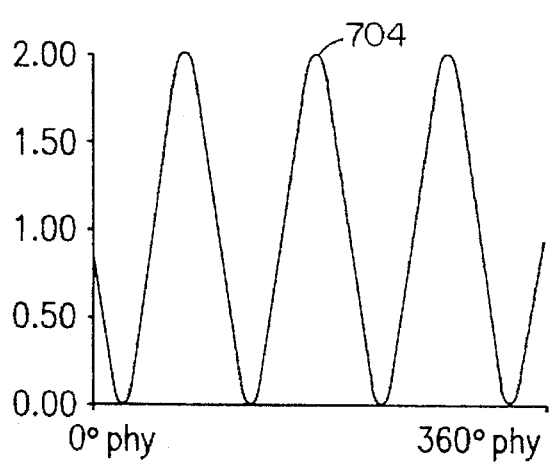
Figure 16D:
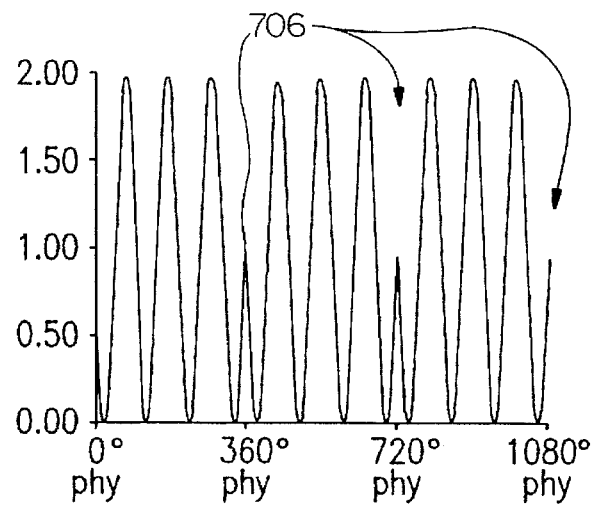
Figure 16E:
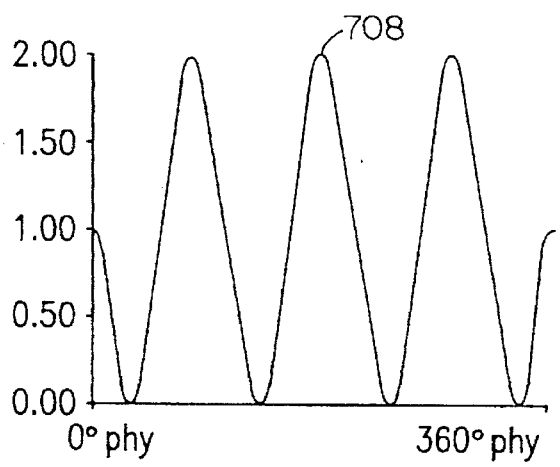
Figure 16F:
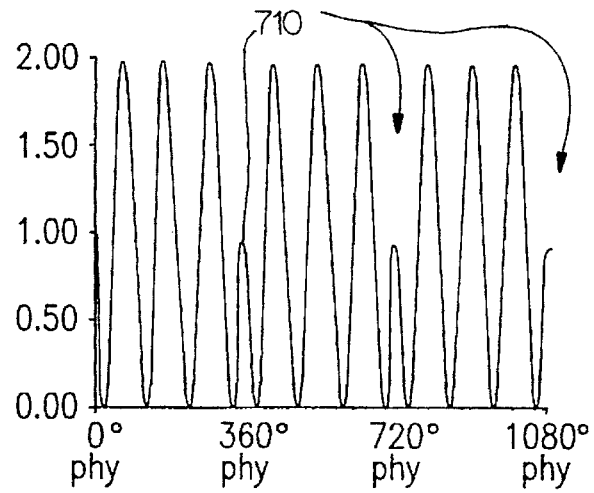
Figure 17B:
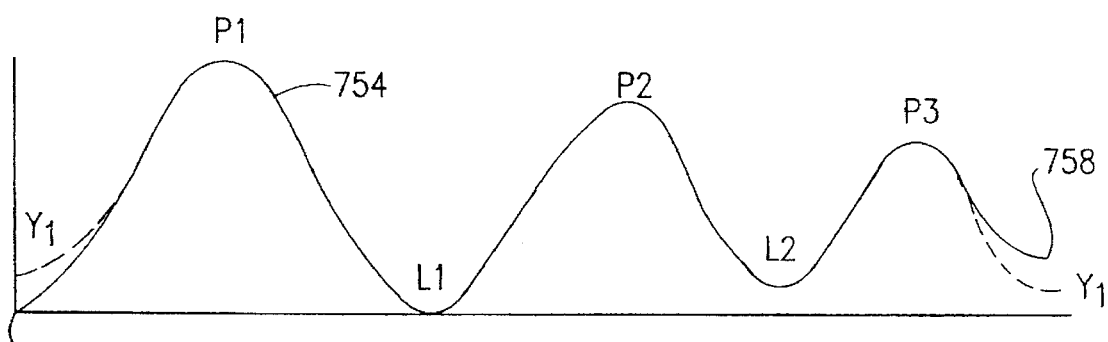

In FIG. 16A, a sinusoidal waveform function 700 has 3.428 cycles per revolution. FIG. 16B shows this function repeated three times (representing three revolutions), and shows a discontinuity 702 occurring at the end of each revolution. To correct for this, waveform function 700 is phase shifted by approximately –90° (actually –0.428 cycles) as shown in FIG. 16C (phase shifted waveform 704). Phase shifted waveform 704 is repeated three times in FIG. 16D. As shown, a discontinuity 706 at the end of each revolution has been diminished. However, sharp spikes still exist at the end of each revolution. These spikes can be smoothed out by empirically, graphically shaping the final shapes on the encoder disc and/or mask. FIG. 16E shows a waveform function 708 which results from the empirically adjusted graphical shapes of the encoder disc and mask. Note the start and end points of waveform 708 have been rounded compared to waveform 704. In FIG. 16F, waveform 708 is repeated three times to illustrate that the discontinuities shown in FIGS. 16B and 16D have been diminished. The electrical signal waveform produced by the corrected graphical function would resemble the repeating plot of FIG. 16F. Note that the above described correction method requires the implementation of a waveform phase shift, by proper positional adjustment of the graphical pattern contained on the encoder disc and/or the mask aperture.

An example of an encoder disc that has been graphically adjusted to correct for a discontinuity is shown in FIG. 17A. An encoder disc 750 comprises a graphical pattern having three graphic cycles 752a–c. A waveform function 754 (See FIG. 17B) is encoded on disc 750. As shown in 17B, waveform 754 is a non-uniform function with a starting point 756 and an ending point 758. As shown, these points are at different levels, and will produce a discontinuity when the function is repeated. In this case, the phase shifting step of the method described above, with reference to FIGS. 16A–F, cannot be employed because of the non-uniformity of the waveform. However, starting point 756 or ending point 758, or both, can be adjusted to minimize the discontinuity.

An adjustment of the incident radiant energy pattern, in the "y" dimension (See FIG. 2), will effect the necessary correction. In this example, the adjustment is accomplished by modifying the graphic pattern on disc 750, as shown in the enlarged view of FIG. 17A. In the enlarged view of FIG.

Figure 17C:
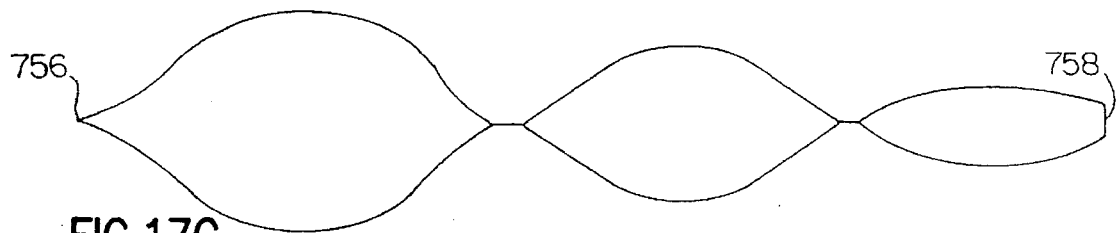
Figure 17D:
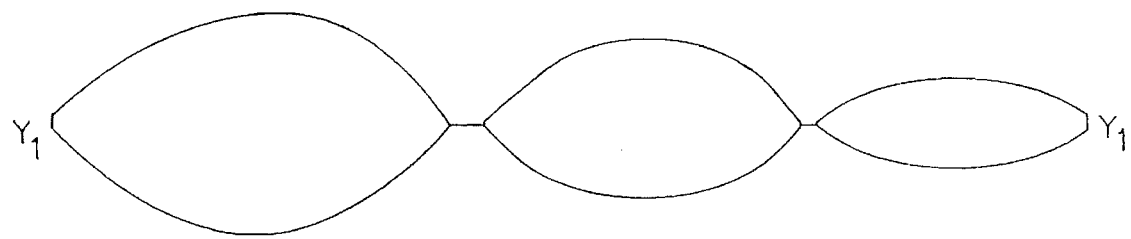

17A, the uncorrected junction between graphic cycles 752a and 752c, at point LC, is shown in solid lines. The graphically corrected junction is shown in phantom lines. In this case, the graphic correction consists of merging the discrete ends of graphic cycles 752a and 752c into one continuous graphical transition Y1. This correction causes start point 756 (See FIG. 17B) to raise up in level and match more closely to end point 758. FIG. 17C shows an equivalent linear representation (X-Y) of the uncorrected graphical pattern on encoder disc 750, and FIG. 17D shows an equivalent linear representation (X-Y) of the corrected graphical pattern. Note the difference between the pattern in FIG. 17C (at points 756 and 758) and the pattern in FIG. 17D (at points Y1, Y1). The points Y1,Y1 in FIG. 17D match.

Figure 18:
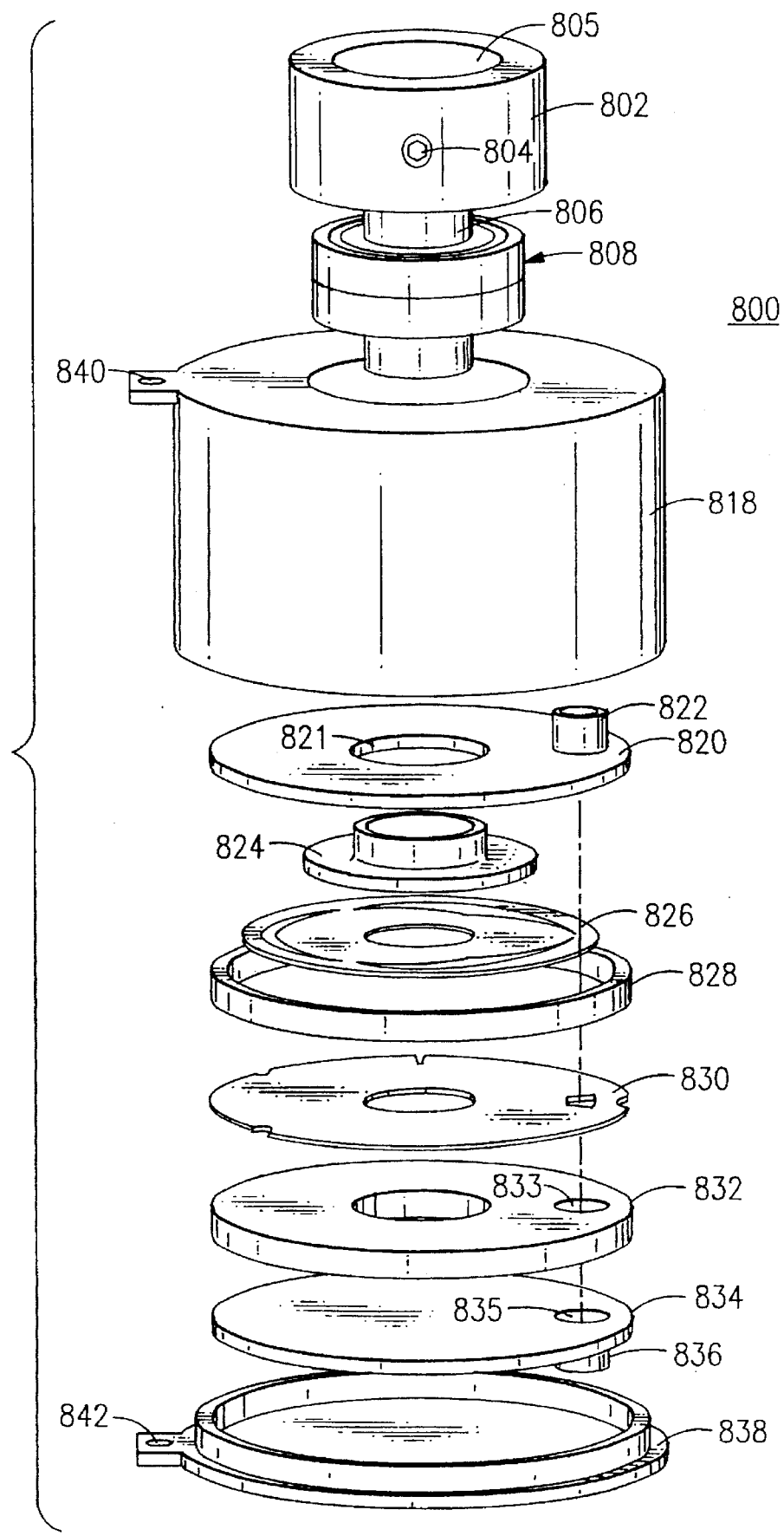
FIG. 18 is an exploded view of an optical encoder constructed in accordance with the present invention.
Figure 19:
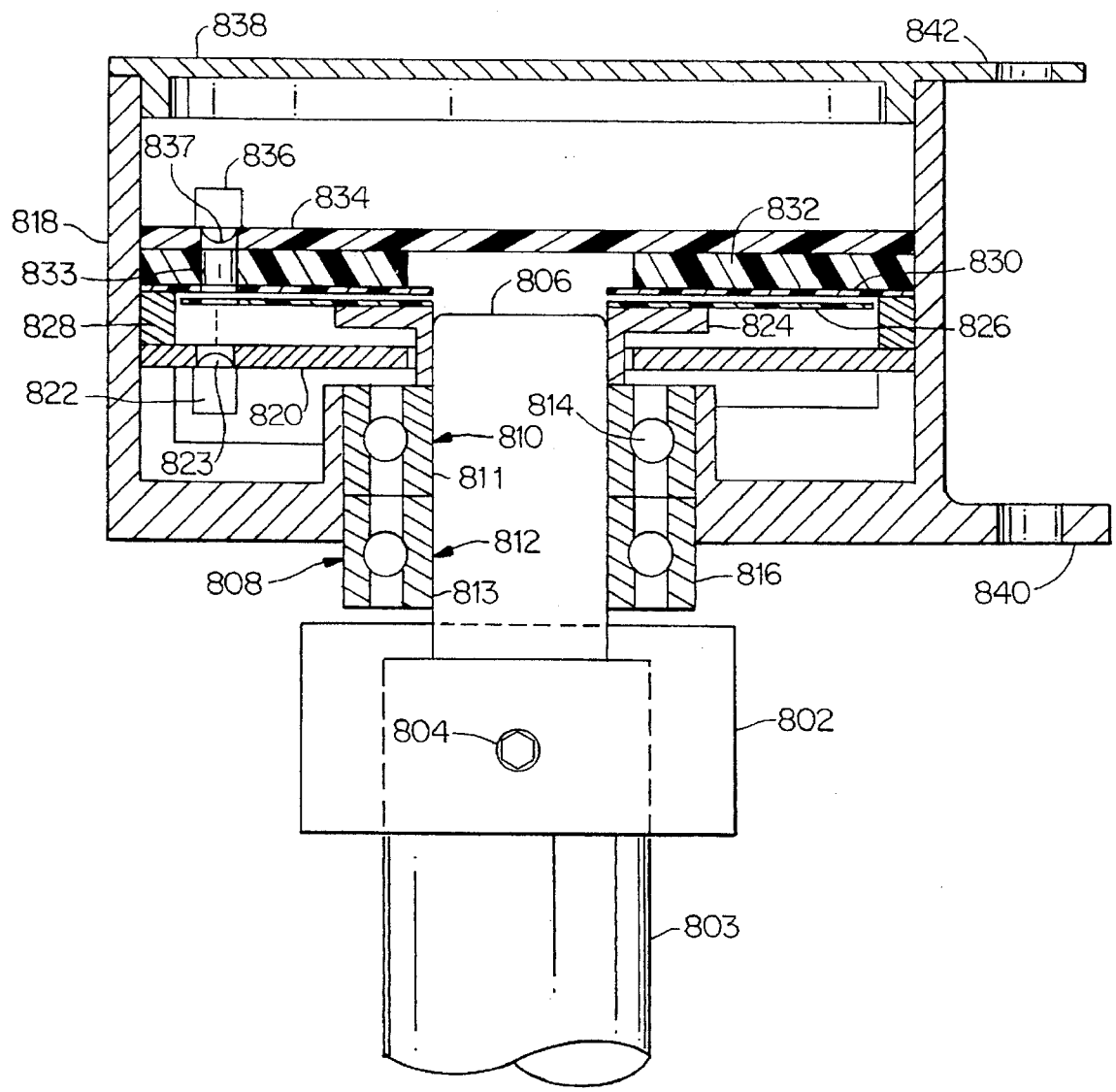
FIG. 19 is a cross-sectional view of the encoder of FIG. 18.

A preferred construction of the optical encoder of the present invention is shown in FIGS. 18 and 19. The illustrated construction may be preferred because it provides a light weight, small profile encoder, that can be directly coupled to the shaft of the motor without additional (external) support. An annular sleeve-shaped coupler 802 is dimensioned to slip fit onto a shaft 803 (See FIG. 19) of a motor intended to be controlled by encoder 800. Coupler 802 is fixed in position by a set screw 804. Coupler 802 may be made of a light weight, yet strong metal. Coupler 802 contains a bore 805 which is dimensioned for a close fit onto shaft 803. The other end of coupler 802 is connected to a spindle shaft 806, either by another set screw (not shown) or by loctite, glue, etc.

With further reference to FIGS. 18 and 19, spindle shaft 806 is part of a spindle system which includes a bearing assembly 808. As more clearly shown in FIG. 19, bearing assembly 808 comprises two adjacent bearing elements 810 and 812. These elements contain internal races 811 and 813, respectively. Each bearing element contains ten ball bearings 814 (two of which are shown for each element), equally spaced about the perimeter of the internal race. Bearing elements 810 and 812 each contain an external race 816.

In FIG. 18, bearing assembly 808 is shown as a separate component. However, in the preferred embodiment, bearing assembly 808 is integrally molded into an encoder housing 818. Depending on the application, bearing assembly 808 could be replaced with a sleeve or plastic bushing. Encoder housing 818 is made of molded plastic, or other suitable mold material.

The technique of integrally molding the bearing assembly 808 with housing 818 allows for a more precise, compact and lighter weight spindle system. The integrally molded arrangement eliminates the need for machined hubs, washers, spacers, and other supports for the bearing assembly. This technique eliminates the assembly step of setting the bearings into the housing hub, and thus avoids alignment problems and the necessity to use additional high precision machined hub spindle components.

With further reference to FIGS. 18 and 19, the internal components of encoder 800 will be described. A disc-shaped LED or emitter circuit card 820 closely fits inside housing 818, and contains a centrally disposed hole 821. Mounted on card 820 is an LED emitter element 822, which is preferably infrared, with a collimating lens 823 (See FIG. 19). In alternative embodiments, more than one emitter element 822 may be used. Other component, as needed, could also be mounted on card 820. In the embodiment of FIGS. 18 and 19, a resistor is mounted on card 820, and is connected in series between a D.C. volt supply and the LED.

A flange 824 is employed to support an encoder disc 826 for rotational motion. Encoder disc 826 is aligned and mounted to flange 824 by using a centering pin tool during assembly. This assembly of flange 824 and encoder 826 is mounted to the free end of spindle shaft 806, after shaft 806 is press fitted through the internal races of bearing assembly 808. Encoder disc 826 may be made of a clear substrate with contact photo transparency material or film, which is commercially available from many sources. The graphically shaped optical window pattern is printed onto the film of disc 826 by standard contact photo processes well known in the integrated circuit board art. Essentially, the entire surface of encoder disc 826 is printed with a black emulsion except for the optical window pattern. A reverse image could be used as well (i.e., opaque on clear), as illustrated in FIG. 8A. For most applications, it is preferred that the printing resolution be greater than 1,000 dots per inch. However, acceptable performance has been achieved, in three cycle encoder discs, with a laser printer having a resolution of 300 dots per inch.

As shown in FIGS. 18 and 19, a spacer ring 828 is inserted against circuit card 820. Ring 828 is also molded, but could be a second indented step in the housing. A mask 830, shaped in the form of a disc, is mounted to a mask substrate 832. Mask 830 is made of the same film material as encoder disc 826. The mask is also printed as described above with respect to encoder disc 826. Mask substrate 832 contains a hole 833 to ensure the necessary optical path through the mask. In general, substrate 832 may contain a number of holes to accommodate a number of optical paths. Mask 830 is also aligned with shaft 806 in a pre-assembly step. In the completed assembly, spacer ring 828 is situated between circuit card 820 and mask 830. The physical separation between encoder disc 826 and mask 830 is typically between 0.004 and 0.020 inches depending, primarily, upon the number of graphic cycles printed on disc 826 and the optical path elements.

Mounted on the other side of substrate 832, is a second circuit card 834 containing a hole 835 which is aligned with hole 833 in substrate 832. In a multi-channel implementation, there would be a multiple number of holes 835 in card 834, matching a multiple number of holes 833 in substrate 832. Mounted on the free side of card 834, and aligned with aperture 835, is a photo-transistor 836 containing a lens 837. Also mounted on card 834 is a potentiometer (not shown). In one embodiment, the emitter of photo-transistor 836 is connected to ground, and its collector serves as the electrical signal output. The potentiometer is connected between ground and a D.C. volt supply. The moveable contact of the potentiometer is connected to the collector output. The encoder package is completed with a cover 838 made of molded material like housing 818.

As shown in FIGS. 18 and 19, a pair of anchor tabs 840 and 842 protrude from housing 818 and cover 838 respectively, and are available to anchor the housing with an anti-rotation clip (described below), to prevent housing 818 from rotating with the shaft. This feature will be described with reference to FIGS. 20-24.

With reference to FIGS. 20-24, the attachment of the optical encoder to a motor will be described. In FIG. 20, an optical encoder 900, constructed in accordance with the present invention, includes a coupler 902 which is aligned with a rear shaft 904 of a motor 906. The internal diameter of the bore contained in coupler 902 is machined to match the outside diameter of shaft 904 for a slip fit. Where needed, the angular position of an encoder disc, located inside encoder 900, can be aligned with the motor poles by rotating coupler 902 (which rotates the encoder disc) to the proper angular position on shaft 904. Coupler 902 is fixedly secured to shaft 904 with a set screw 908.

As shown in FIGS. 21–22, an anti-rotation clip 910 is hooked onto one of the anchor tabs projecting from encoder 900. The other end of clip 910 may be clamped to an existing screw or bolt secured directly to motor 906. It is preferred, however, to custom mount clip 910 onto motor 906. This may be accomplished by mounting a standoff 912 to motor 906 with a screw, as shown in FIGS. 21–22. Standoff 912 should be tangentially positioned relative to encoder 900, as shown in FIG. 22. This mounting arrangement ensures more accuracy in preventing "angular movement error" of the encoder.

As shown in FIG. 21, encoder 900 can be housed within a cover 914 which is bolted to the motor. Cover 914 could be "ruggedized", ventilated, etc., and mounted to the motor in any number of ways without impacting or altering the motor encoder alignment and performance. As an option, a power amplifier 916 may be mounted on the inside wall of cover 914 and used to amplify the output signal from the encoder.

FIGS. 23A–B are side elevation and top plan views, respectively, of anti-rotation clip 910. Clip 910 may be made of, for example, spring temper, 302 SS Wire, having a diameter of 0.037 inches. As shown in FIG. 23A, clip 910 includes a mounting loop 911a which is used to mount clip 910 to a motor, standoff or bracket. As shown in FIG. 23B, clip 910 also includes an anchor loop 911b which hooks onto an anchor tab protruding from the housing of encoder 900.

As shown in FIG. 24, anti-rotation clip 910 can also serve as an adjustment arm for adjusting the angular position of the encoder housing, and thus the position of the mask relative to the encoder disc. Such an adjustment is desirable to fine tune the mask position relative to the windings of the motor after aligning and securing encoder 900. This adjustment allows the encoder signals to be properly timed to lead or lag the motor windings for optimal torque and power adjustment. As shown in FIG. 24, standoff 912 has been replaced with an upright bracket 912a. Bracket 912a has a bolt 918 inserted through its distal end, and a nut 920 retains the end of anti-rotation clip 910. Angular adjustment of encoder 900 is achieved simply by turning bolt 918, which causes clip 910 to move along a tangential path relative to encoder 900.

Figure 25A:
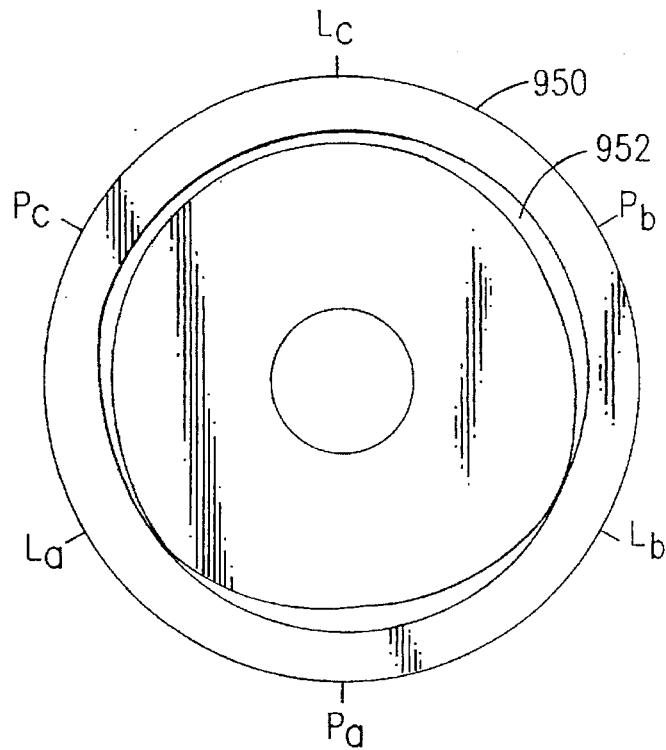
FIG. 25A-B shows, respectively, a top plan view of an encoder disc of the present invention having a graphical pattern which corresponds to a non-integer waveform function, and a graphical plot of a non-integer waveform function corresponding to the graphical pattern of FIG. 25A.
Figure 25B:
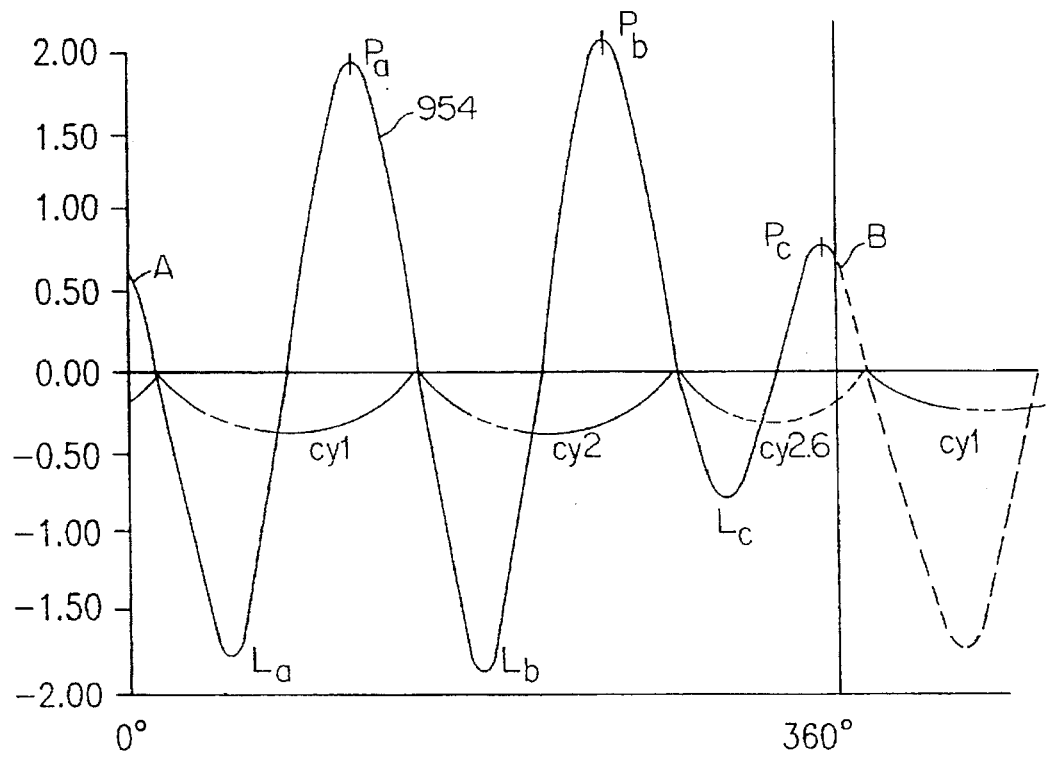

As mentioned above, it may be desirable in certain applications to drive an A.C. motor with a signal that has a non-integer number of cycles for each revolution of the motor shaft. In the example discussed above, a signal having 3.428 cycles per revolution may be desirable to achieve a 60 Hz power signal frequency from the encoder when the motor is operating at its rated speed (less than synchronous speed). It was suggested that a waveform function having 3.428 cycles could be encoded onto an encoder disc. FIG. 25A–B shows a top plan view of an encoder disc 950 containing graphical pattern 952. Graphical pattern 952 represents an optically encoded waveform function having 2.6 electrical cycles. FIG. 25B shows a waveform function 954 which is graphically encoded onto disc 950 as pattern 952. Points La, Pa, Lb, Pb, Lc, and Pc mark angular locations along graphical pattern 952 (See FIG. 25A), and corresponding points La, Pa, Lb, Pb, Lc, and Pc are marked on waveform function 954 (See FIG. 25B). As shown FIG. 25B, a start point A of waveform function 954 matches an end point B of the function.

Figure 26A:
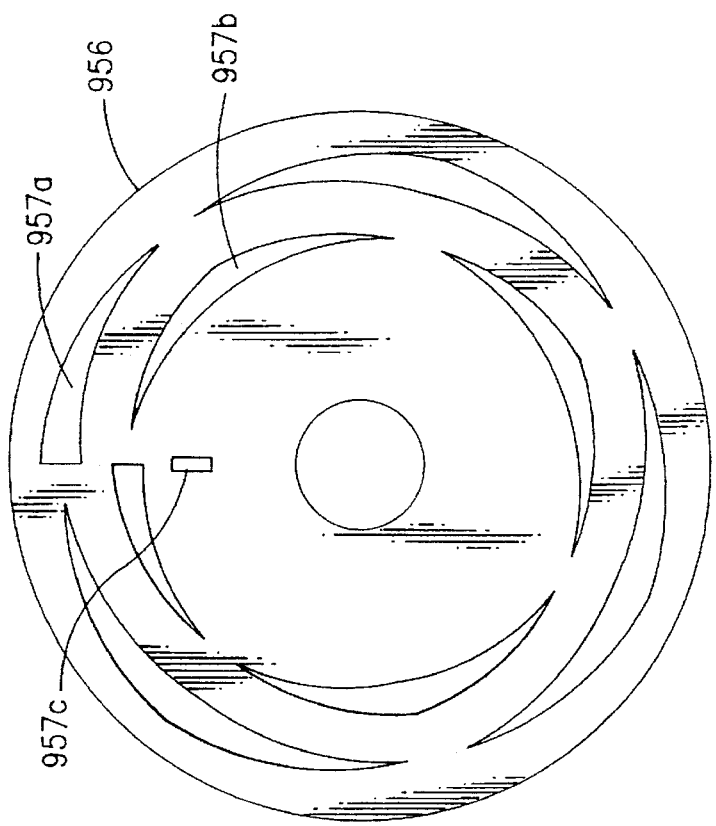
FIG. 26A-B shows, respectively, a top plan view of another encoder disc of the present invention, and a graphical plot of a continuous waveform output corresponding to the encoder disc of FIG. 26A.
Figure 26B:
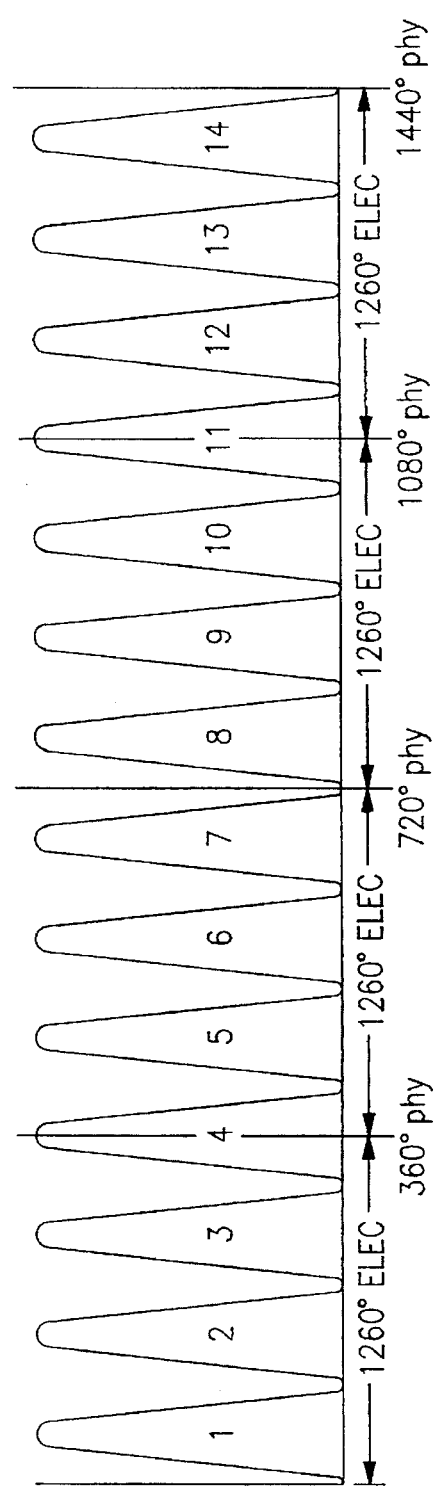

Referring now to FIG. 26A–B, another way to produce a non-integer waveform is shown. In FIG. 26A, an encoder disc 956 has two graphical patterns 957a and 957b, and a locator aperture 957c. Graphical patterns 957a–b represent waveform functions having 3.5 electrical cycles each. Each 360° physical revolution of encoder disc 956 produces one transition signal as a result of locator aperture 957c. Each transition signal, combined with elementary circuitry, causes the encoder waveform output to alternate between patterns 957a and 957b. The continuous waveform output of this method is shown in FIG. 26B. As is evident, this example will produce seven full electrical cycles for every two complete 360° physical revolutions of disc 956, or 3.5 electrical cycles per one revolution. Other non-integer waveform cycles can be produced with this method by varying the number of concentric graphic patterns and the number of graphical cycles in each pattern.

Figure 27A:
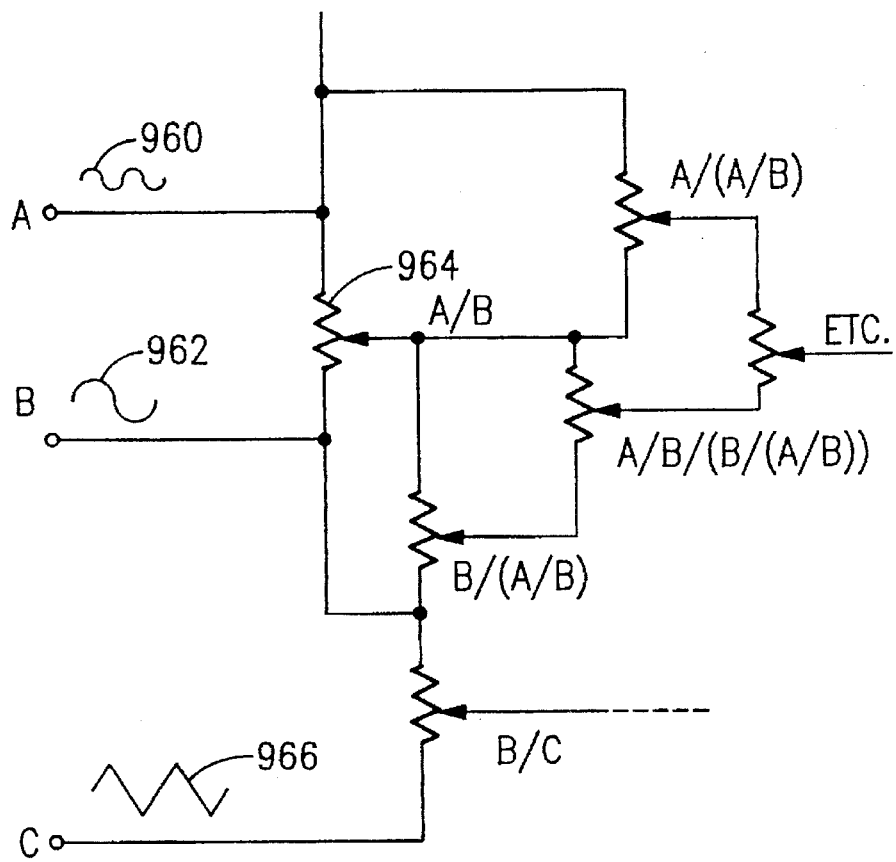
FIG. 27A-B are circuit diagrams showing waveform shaping by electrical waveform combining.
Figure 27B:
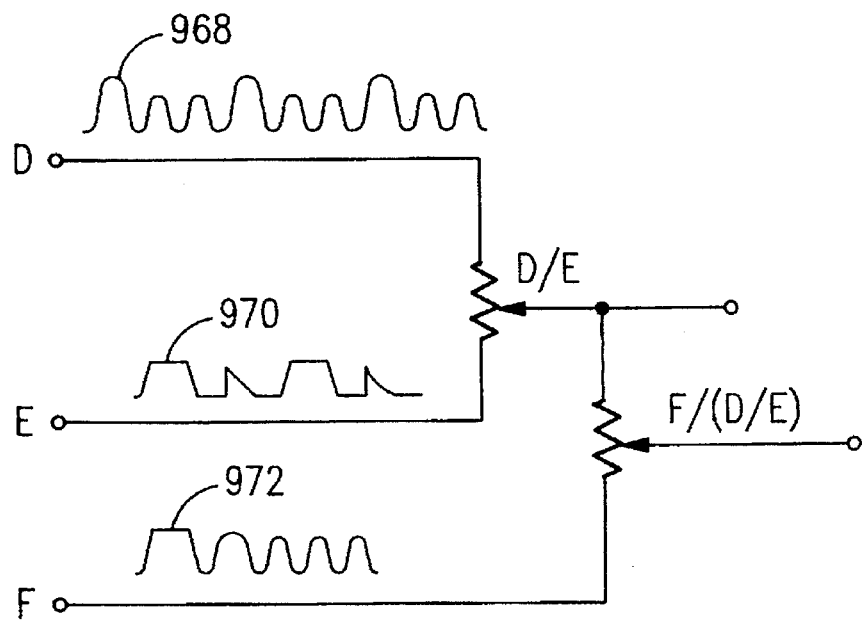

FIGS. 27A–B shows an alternative method of producing a signal having a non-integer number of cycles per revolution. In this alternative method, the desired waveform is derived electrically, simply by combining two or more waveforms. For example, as shown in FIG. 27A, a signal 960 at input A has N1 cycles per revolution which creates a frequency F1. A signal 962 at input B has N2 cycles per revolution creating a frequency F2. Signals 960 and 962 may be combined in various ways to produce still other frequencies Fn. These various "new" frequency results, Fn, can be derived from many standard frequency mixing methods of the present art. However, due to the non-linear nature of some of the output signals generated by the encoder of the present invention (i.e. variable amplitude, phase, duty cycle, etc.), both within one electrical cycle or over "N" cycles, other new frequency results should be achievable.

Also, in accordance with the present invention, such frequencies (cycles or waveforms) can be "shared" internal or external to the encoder. FIGS. 27A–B show a simple method for combining just two signals. These two signals are combined with a potentiometer 964, and the output A/B of potentiometer 964 will yield a signal having a new number of cycles (frequencies). As shown in FIG. 27A, different combinations of signals 960 and 962 can be obtained from the network of FIG. 27A.

The electrical combining, modifying and summing technique as described in FIG. 27A can also be used to further shape the output signals from the encoder of the present invention. As FIG. 27A illustrates, a triangular waveform 966 may be combined with sinusoidal waveform 962 to yield a differently shaped waveform at output B/C. FIG. 27A illustrates a simple "passive" method of waveform function modification. However the waveform types and mathematical derivations could be shaped, enhanced, combined in numerous other ways, but heretofore not made possible without this unique method of waveform creation.

FIG. 27B shows a similar waveform combining network, illustrating its capability of combining an amplitude varying function 968, at input D, with an arbitrary function 970, at input E, to produce a unique waveform output at D/E. Also, as shown in FIG. 27B, waveform output D/E can be combined with a frequency varying waveform 972 to produce an output F/(D/E).

While the preferred embodiments of the invention have been particularly described in the specification and illustrated in the drawings, it should be understood that the invention is not so limited. Many modifications, equivalents and adaptations of the invention will become apparent to those skilled in the art without departing from the spirit and scope of the invention, as defined in the appended claims.

For example, the same electrical signal generated by an encoder of the present invention from the cyclic motion of a primary electro-mechanical machine, could be used to drive other electro-mechanical machines (e.g., motors) having similar needs to the primary electro-mechanical machine. In such an embodiment, the other machines will track or follow (i.e., be "slave driven" by) the primary machine's cyclic motion.

In another embodiment, a plurality of electrical signals could be produced by the encoder of the present invention, as in the embodiment shown in FIG. 3; but, in this case, each signal is designed to address a different control or commutation function of an electro-mechanical machine from which the encoder has generated the signals. Alternatively, each signal could be designed to control or commutate other electro-mechanical machines in a slaved fashion. For example, other motors with different pole, phase, voltage, etc. configurations could be slave driven. Different motor application loads, like a compressor and fan, or two fans turning at different speeds, could be driven from a single encoder of the present invention. Or, a "white noise" or harmonic damping signal could be produced by the encoder (in addition to other signals), and transmitted over a power line to cancel cyclic electrical power line noise.

What is claimed is:

1. An optical encoder apparatus for converting cyclic motion of an electro-mechanical machine into an electrical commutation signal having a waveform and a frequency for driving said machine at an operating speed, said apparatus comprising:

photo-detection means for generating an electrical signal in response to a pattern of radiant energy incident on said photo-detection means; and optical means, optically coupled to said photo-detection means, and configured to be actuated by the cyclic motion of said machine, for modifying the pattern of radiant energy incident on said photo-detection means in accordance with a graphical function as said optical means is actuated by the cyclic motion of said machine, said optical means including an optical element configured to scan relative to said photo-detection means in accordance with the cyclic motion of said machine, said optical element containing an optically detectable pattern which is optically coupled to said photo-detection means, said optical means further including aperture means associated with said photo-detection means, for permitting a controlled amount of radiant energy to pass to said photo-detection means, said aperture means and the pattern of said optical element being defined by said graphical function, said graphical function being derived form the waveform of said commutation signal and defining a relationship between the operating speed of the cyclic motion of said machine and the frequency of said communication signal, whereby said commutation signal is generated from said photo-detection means as the pattern of said optical element is scanned relative to said aperture means.

2. An optical encoder apparatus as recited in claim 1, further comprising emitter means, optically coupled to said photo-detection means, for directing a supply of radiant energy to said photo-detection means.

3. An optical encoder apparatus as recited in claim 1, wherein the optically detectable pattern of said optical element includes at least one optically detectable, graphically shaped cycle which is configured in accordance with said graphical function.

4. An optical encoder apparatus as recited in claim 1, wherein the pattern of said optical element includes a number of optically detectable, graphically shaped cycles which are configured in accordance with said graphical function.

5. An optical encoder apparatus as recited in claim 1, wherein said aperture means includes a mask positioned between the optical element and said photo-detection means, said mask containing an aperture which is optically coupled to said photo-detection means, said aperture being graphically shaped in accordance with said graphical function.

6. An optical encoder apparatus as recited in claim 1, wherein said photo-detection means includes a photo-responsive surface, and said aperture mans constitutes the dimensions of said photo-responsive surface.

7. An optical encoder apparatus as recited in claim 1, wherein a relative phase of said commutation signal is determined by the position of the optically detectable pattern of said optical element relative to the position of said photo-detection means, at a particular point in a cycle of the motion of said machine.

8. An optical encoder apparatus as recited in claim 1, wherein the electro-mechanical machines an electric motor having a rotor, and the cyclic motion of said machine is the rotational motion of the rotor.

9. An optical encoder apparatus as recited in claim 3, wherein said at least one graphically shaped cycle is an optical window which allows radiant energy to pass therethrough.

10. An optical encoder apparatus as recited in claim 4, wherein the frequency of said commutation signal is determined by multiplying the number of graphically shaped cycles included in the optically detectable pattern of said optical element by the operating speed in cycles per second of the cyclic motion of said machine.

11. An optical encoder apparatus as recited in claim 4, wherein the waveform of said commutation signal is determined by the shapes and relative sizes of the graphically shaped cycles included in the pattern of said optical element.

12. An optical encoder apparatus as recited in claim 4, wherein said number of graphically shaped cycles is a non-integer number greater than one.

13. An optical encoder apparatus as recited in claim 5, wherein the optically detectable pattern of said optical element contains at least one aperture for permitting radiant energy to pass through the optical element to said mask.

14. An optical encoder apparatus as recited in claim 7, further comprising means for adjusting the position of said photo-detection means and said aperture means relative to the position of the optically detectable pattern, at a particular point in a cycle of the motion of said machine, such that the relative phase of said commutation signal is correspondingly adjusted.

15. An optical encoder apparatus as recited in claim 11, wherein at least one graphically shaped cycle included in the pattern of said optical element has a size which is not uniform to the other graphically shaped cycles included in the pattern.

16. An optical encoder apparatus as recited in claim 11, wherein the sizes of the graphically shaped cycles included in the pattern of said optical element are non-uniform.

17. A method of controlling an electro-mechanical machine of the type which produces cyclic mechanical motion, using the optical encoder of claim 1, said method comprising the steps of:

(a) coupling said encoder to the cyclic motion of said machine;

(b) producing cyclic motion from said machine;

(c) generating an electrical commutation signal from said encoder; and (d) driving said machine with said commutation signal.

18. The method as recited in claim 17, further comprising the step of amplifying said commutation signal before driving said machine with said signal.

19. The method as recited in claim 17, further comprising the step of varying the amplitude level of said commutation signal to vary the speed of the cyclic motion of said machine.

20. An optical encoder apparatus for converting the rotational motion of an electric motor into an electrical commutation signal having a waveform and a frequency for driving said motor at an operating speed, said apparatus comprising:

emitter means for emitting a supply radiant energy;

photo-detection means, optically coupled to the supply of radiant energy from said emitter means, for generating an electrical signal in response to a pattern of radiant energy incident on said photo-detection means; and optical means, optically coupled to said photo-detection means, and configured to be actuated by the rotor of said motor, for modifying the pattern of radiant energy incident on said photo-detection means in accordance with a graphical function as said optical means is actuated by the rotor of said motor, said optical means including an optical element configured to scan relative to said photo-detection means in accordance with the motion of the rotor of said motor, said optical element containing an optically detectable pattern which is optically coupled to said photo-detection means, said optical means further including aperture means associated with said photo-detection means, for permitting a controlled amount of radiant energy to pass to said photo-detection means, said aperture means and the pattern of said optical element being defined by said graphical function, said graphical function being derived from the waveform of said commutation signal and defining a relationship between the operating speed of said motor and the frequency of said commutation signal, whereby said commutation signal is generated from said photo-detection means as the pattern of said optical element is scanned relative to said aperture means.

21. An optical encoder apparatus as recited in claim 20, further comprising means for amplifying said commutation signal to a level suitable for driving said motor at a desired operating speed.

22. An optical encoder apparatus as recited in claim 20, wherein said aperture means includes a mask positioned between the optical element and said photo-detection means, said mask containing an aperture optically coupled to said photo-detection means, the aperture of said mask being graphically shaped in accordance with said graphical function.

23. An optical encoder apparatus as recited in claim 20, wherein said photo-detection means includes a photo-responsive surface, and said aperture means constitutes the dimensions of said photo-responsive surface.

24. An optical encoder apparatus as recited in claim 20, wherein a relative phase of said commutation signal is determined by the position of the optically detectable pattern relative to the position of said photo-detection means, at a particular angular position of the motor rotor.

25. An optical encoder apparatus as recited in claim 20, wherein the pattern of said optical element includes a number of optically detectable, graphically shaped cycles which are configured in accordance with said graphical function.

26. An optical encoder apparatus as recited in claim 21, further comprising means for adjusting the amplitude level of said commutation signal to effectuate an adjustment in the speed of said motor.

27. An optical encoder apparatus as recited in claim 22, wherein the waveform of said commutation signal is determined by the shape of the aperture of said mask.

28. An optical encoder apparatus as recited in claim 24, further comprising means for adjusting the position of said photo-detection means and said aperture means relative to the position of said optically detectable pattern, at a particular angular position of said motor rotor, such that the relative phase of said commutation signal is correspondingly adjusted.

29. An optical encoder apparatus as recited in claim 25, wherein the waveform of said commutation signal is determined by the shapes and relative sizes of the graphically shaped cycles included in the pattern of said optical element.

30. An optical encoder apparatus as recited in claim 25, wherein at least one graphically shaped cycle included in the pattern of said optical element has a size which is not uniform to the other graphically shaped cycles included in the pattern.

31. An optical encoder apparatus as recited in claim 29, wherein the sizes of the graphically shaped cycles included in the pattern of said optical element are non-uniform.

32. An optical encoder apparatus as recited in claim 29, wherein the graphically shaped cycles are configures to produce a trapezoidal waveform in said commutation signal.

33. An optical encoder apparatus as recited in claim 29, wherein the graphically shaped cycles are configured to produce a non-uniform sinusoidal waveform in said commutation signal.

34. An optical encoder apparatus as recited in claim 29, wherein the graphically shaped cycles are configures to produce a bottom-rounder trapezoidal waveform in said commutation signal.

35. An optical encoder apparatus as recited in claim 29, wherein the graphically shaped cycles are configured to produce a non-uniform complex waveform in said commutation signal.

36. An optical encoder apparatus as recited in claim 29, wherein said optical element is an encoder disc, configures to rotate around a central axis point in accordance with the rotation of the motor rotor, said graphically shaped pattern being concentrically disposed on said disc about the central axis point.

37. An optical encoder apparatus as recited in claim 36, further comprising spindle means for transferring the rotational motion of the motor rotor to said encoder disc, said spindle means including a rotatable spindle shaft with first and second ends, said encoder disc being coupled to said spindle shaft adjacent to the first end; and wherein said aperture means is configured as a disc-shaped mask having its central axis point substantially aligned with the longitudinal axis of said spindle shaft.

38. An optical encoder apparatus as recited in claim 37, further comprising means for coupling the shaft of said spindle means to the rotor of said motor, said coupling means being mounted on the second end of said spindle shaft.

39. A method of controlling an electric motor having a rotor which produces rotational motion using the optical encoder of claim 20, said method comprising the steps of:

(a) coupling said encoder to the rotational motion of the rotor of said motor, such that said optical element is actuated by the rotor of said motor;

(b) operating said motor to produce rotational motion of the rotor;

(c) modifying the pattern of radiant energy incident on said photo-detection means in accordance with said graphical function as said optical element is actuated by said motor;

(d) generating said electrical commutation signal from said photo-detection means; and (e) driving said motor with said commutation signal.

40. The method as recited in claim 39, further comprising the step of amplifying said electrical commutation signal before powering said motor with said signal.

41. The method as recited in claim 39, further comprising the step of varying the amplitude level of said electrical commutation signal to vary the speed of said motor.

42. The method as recited in claim 39, wherein the rotor of said motor has a number of pole pairs associated therewith at least during the operation of said motor, the optically detectable pattern of said optical element corresponds to the number of pole pairs in the rotor of said motor, and wherein said step (a) includes coupling the optical element to the rotor of said motor, and wherein said method further comprises the step of (f) substantially aligning the optically detectable pattern of said optical element with the pole pairs of the rotor of said motor.

43. The method of claim 42, wherein said aperture means includes a mask positioned between the optical element and said photo-detection means, said mask containing an aperture for permitting radiant energy received from the optical element to pass through the mask to said photo-detection means, said motor having a stator with windings associated therewith, and wherein said method further comprises the step of (g) adjusting the position of the aperture of said mask and said photo-detection means relative to the winding in the stator of said motor.

44. A method of controlling the speed of an electric motor having a rotor which produces rotational motion, using the optical encoder of claim 49, said method comprising the steps of:

(a) coupling said encoder to the rotational motion of the rotor of said motor, such that said optical element is actuated by the rotor of said motor;

(b) operating said motor to produce rotational motion of the rotor;

(c) modifying the pattern of radiant energy incident on said photo-detection means in accordance with said graphical function as said optical element is actuated by said motor;

(d) generating said electrical commutation signal from said photo-detection means;

(e) amplifying said commutation signal;

(f) driving said motor with said amplified commutation signal; and (g) varying the amplitude level of said commutation signal to control the speed of said motor.

45. An optical encoder apparatus for converting the motion of a rotor of a multi-phase electric motor into a plurality of electrical commutation signals each having a waveform, frequency and relative phase for driving said multi-phase motor at an operating speed, said apparatus comprising:

a plurality of photo-detectors, each of which generates an electrical signal in response to a pattern of radiant energy incident thereon; and optical means, optically coupled to said plurality of photo-detectors, and configures to be actuated by the rotor of said motor, for modifying a pattern of radiant energy incident on each of said plurality of photo-detectors in accordance with respective graphical functions as said optical means is actuated by the rotor of said motor, said optical means including an optical element which contains a plurality of concentrically disposed optically detectable patterns, said optical element being configures to rotate upon actuation thereof by the rotor of said motor, such that said optically detectable patterns are made to scan past said plurality of photo-detectors in accordance with the motion of the rotor, each one of said optically detectable patterns being associated with and optically coupled to a different one of said plurality of photo-detectors, said optical means further including a plurality of aperture means, each one of which corresponds to a different one of said optically detectable patterns, for permitting a controlled amount of radiant energy to pass to each of said plurality of photo-detectors, each one of said graphical functions being associated with a different one of said optically detectable patterns and with a different one of said commutation signals, each optically detectable pattern and corresponding aperture means being defined by their associated graphical function, each graphical function being derived from the waveform of the associated commutation signal and defining a relationship between the operating speed of said motor and the frequency of said associated commutation signal, each one of said optically detectable patterns being associated with a different one of said commutation signals, the relative phase of each of said plurality of commutation signals being established by the position of the associated optically detectable pattern relative to the position of the corresponding aperture means and photo-detector, at a particular angular position of the rotor of said motor, the relative positions of each optically detectable pattern to the corresponding aperture means and photo-detector being different from each other, whereby said plurality of commutation signals are generated from said plurality of photo-detectors as said plurality of optically detectable patterns are scanned relative to said plurality of aperture means.

46. A method of operating a motor having a rated power frequency, speed and power voltage, using an optical encoder apparatus configured to be coupled to a shaft of said motor, wherein said apparatus includes photo-detection means for generating an electrical signal in response to a pattern of radiant energy incident on said photo-detection means; and optical means, optically coupled to said photo-detection means and configures to be actuated by the shaft of said motor, for modifying the pattern of radiant energy incident on said photo-detection means in accordance with a graphical function as said optical means is actuated by said motor, such that an electrical commutation signal is generated from said photo-detection means, said graphical function being a transform of a waveform function, said waveform function being defined by a predetermined number of waveform cycles over one revolution of the motor shaft, said predetermined number of waveform cycles being greater than the number necessary to produce the rated power frequency for said commutation signal, when said motor is operating at the rated speed;

said method comprising the steps of:
(a) coupling said encoder apparatus to the shaft of said motor;
(b) operating said motor such that the shaft of said motor rotates;
(c) generating said commutation signal from said encoder;
(d) amplifying said commutation signal to a level that will produce a desired operating speed of said motor; and
(e) powering said motor with the amplified commutation signal.

47. The method as recited in claim 46, further comprising the step of:
(f) varying the level of the commutation signal to vary the speed of said motor.

48. An optical encoder apparatus for converting the motion of a rotor of an A.C. induction motor into an electrical commutation signal having a waveform and frequency for driving said motor at an operating speed, wherein said A.C. motor has a designed theoretical synchronous speed, said apparatus comprising:

photo-detection means for generating an electrical signal from a pattern of radiant energy incident on said photo-detection means; and optical means, optically coupled to said photo-detection means and configured to be actuated by the rotor of said motor, for modifying the pattern of radiant energy incident on said photo-detection means in accordance with a graphical function as said optical means is actuated by the rotor of said motor, said optical means including an optical element configures to scan relative to said photo-detection means in accordance with the motion of the rotor of said motor, said optical element containing an optically detectable pattern which is optically coupled to said photo-detection means, said optical means further including aperture means associated with said photo-detection means, for permitting a controlled amount of radiant energy to pass to said photo-detection means, the pattern of said optical element and said aperture means being defined by said graphical function, said graphical function being derived from a waveform function, said waveform function being determined by the waveform of said commutation signal and being defined by a predetermined number of waveform cycles over one revolution of said motor rotor, said number of waveform cycles being greater than the number necessary to produce the frequency of said commutation signal at the designed theoretical synchronous speed, whereby said commutation signal is generated from said photo-detection means as the pattern of said optical element is scanned relative to said aperture means.

49. A method of configuring an optical encoder of the type which converts cyclic motion of an electro-mechanical machine into a particular electrical signal having a frequency which is related to the speed of the cyclic motion of said machine, said method comprising the steps of:
(a) providing a photo-detector for generating the particular electrical signal at an output of said encoder;
(b) providing optical means for modifying a pattern of radiant energy incident on said photo-detector as a function of the cyclic motion of said machine;
(c) specifying the particular electrical signal at the output of said encoder, the specified electrical signal having a particular waveform;
(d) determining a waveform function based on the particular waveform of the specified electrical signal, said waveform function defining the relationship between the speed of the cyclic motion of said machine and the frequency of the specified electrical signal;
(e) deriving a graphical function from said waveform function, said graphical function defining at least one graphically shaped pattern; and
(f) configuring said encoder in accordance with said graphical function, including encoding said optical means with said at leas tone graphically shaped pattern, such that, in operation, said optical means modifies the pattern of radiant energy incident on said photo-detector in accordance with said at least one graphically shaped pattern,
whereby, in operation of said encoder, the particular electrical signal is produced at the output of said encoder.

50. The method as recited in claim 49, wherein said at least one graphically shaped pattern is derived from said waveform function by using area-fill equations.

51. The method as recited in claim 49, wherein said optical means includes an optical element, and wherein said method further comprises the step of
(g) coupling the optical element of said optical means to the cyclic motion of said electro-mechanical machine.

52. The method as recited in claim 51, wherein said step (f) includes encoding the optical element of said optical means with said at least one graphically shaped pattern.

53. The method as recited in claim 51, wherein said optical means further includes a mask positioned between the optical element and said photo-detector, said mask containing an aperture which is optically coupled to said photo-detector, and
wherein said step (f) includes shaped the aperture of said mask in accordance with said at least one graphically shaped pattern.

54. The method as recited in claim 52, wherein the cyclic motion of said electro-mechanical machine is defined by a rotating shaft, and
wherein said step (g) includes coupling the optical element to the shaft of said machine.

55. The method as recited in claim 53, wherein said step (f) further includes configuring the optical element of said optical means with at least one aperture which permits radiant energy to pass through the optical element to said mask.

56. The method as recited in claim 54, wherein said step (c) further includes specifying a relative phase for said particular electrical signal, and
wherein said method further comprises the step of
(h) positioning said at least one graphically shaped pattern relative to a position of said photo-detector, for a particular angle of rotation of the shaft, the relative position of said at least one graphically shaped pattern being selected to produce the relative phase of said particular electrical signal at the output of said encoder.

57. The method as recited in claim 49, wherein said electro-mechanical machine is an electric motor the cyclic motion of which is define by a rotating shaft of said motor and said specified electrical signal is a commutation signal for driving said electric motor, and wherein said method further comprises the step of
(g) coupling said encoder to the shaft of said motor.

58. The method as recited in claim 57, wherein said optical means includes an encoder disk which contains said at least one graphically shaped pattern, said step (g) includes coupling the encoder disk to the shaft of said motor, and said step (c) further includes specifying a relative phase of said commutation signal, and wherein said method further comprises the step of (h) positioning said at least one graphically shaped pattern relative to a position of said photo-detector, for a particular angle of rotation of the motor shaft, the relative position of said at least one graphically shaped pattern being selected to produce the relative phase of said commutation signal at the output of said encoder.

59. The method as recited in claim 57, wherein said optical means includes an encoder disk containing said at least one graphically shaped pattern, said motor having a rotor with a number of pole pairs associated therewith at least during the operation of said motor, and said at least one graphically shaped pattern corresponding to the number of pole pairs in the rotor of said motor, and wherein said step (g) includes coupling the encoder disk to the shaft of said motor, and wherein said method further comprises the step of (h) substantially aligning said at least one graphically shaped pattern with the pole pairs of the rotor of said motor.

60. The method as recited in claim 59, wherein said motor has a stator with windings associated therewith, and wherein said method further comprises the steps of:

(i) positioning a mask between the encoder disk and said photo-detector, said mask containing an aperture for permitting radiant energy received from the encoder disk to pass through the mask to said photo-detector; and (j) adjusting the position of the aperture of said mask and said photo-detector relative to the windings in the stator of said motor.

61. A method of configuring an encoder of the type which converts cyclic motion of an electro-mechanical machine into a particular electrical signal having a frequency which is related to the speed of the cyclic motion of said machine, said method comprising the steps of:

(a) providing encoder means for generating the particular electrical signal from the cyclic motion of said machine;

(b) specifying the particular electrical signal at an output of said encoder, the specified electrical signal having a particular waveform;

(c) determining a waveform function based on the particular waveform of the specified electrical signal, said waveform function defining the relationship between the speed of the cyclic motion of said machine and the frequency of the specified electrical signal;

(d) deriving a graphical function from said waveform function, said graphical function defining at least one graphically shaped pattern; and (e) configuring said encoder in accordance with said graphical function, including encoding said encoder means with said at least one graphically shaped pattern, such that, in operation, said encoder means generates an electrical signal in accordance with at least one graphically shaped pattern, whereby, in operation of said encoder, said particular electrical signal is produced at the output of said encoder.

62. The method as recited in claim 61, wherein said encoder is an optical encoder and said step (a) includes:

(i) providing a photo-detector for generating the electrical signal at an output of said encoder; and (ii) providing optical means for modifying a pattern of radiant energy incident on said photo-detector as a function of the cyclic motion of said machine; and wherein said step (f) includes configuring said optical means with said graphical function, including encoding said optical means with said at least one graphically shaped pattern, such that said optical means will modify the pattern of incident radiant energy at said photo-detector in accordance with said graphically shaped pattern.

63. A method of controlling an electro-mechanical machine of the type which produces cyclic mechanical motion, said method comprising the steps of:

(a) modifying a pattern of radiant energy in accordance with a mathematically defined graphical function and in accordance with the cyclic motion of said machine;

(b) generating an electrical commutation signal in response to said modified pattern of radiant energy; and (c) driving said machine with said commutation signal.

64. An optical encoder apparatus for converting cyclic motion of an electro-mechanical machine into an electrical commutation signal having a waveform and a frequency for driving said machine at an operating speed, said apparatus comprising:

photo-detection means, having a plurality of photo-responsive surfaces, for generating an electrical signal in response to a plurality of patterns of radiant energy incident on the plurality of photo-responsive surfaces respectively; and optical means, optically coupled to said photo-detection means, and configured to be actuated by the cyclic motion of said machine, for modifying said plurality of radiant energy patterns incident on said photo-detection means in accordance with a graphical function as said optical means is actuated by the cyclic motion of said machine, said optical means including an optical element configured to scan relative to said photo-detection means in accordance with the cyclic motion of said machine, said optical element containing an optically detectable pattern which is optically coupled to said photo-detection means, said optical means further including aperture means associated with said photo-detection means, for permitting a controlled amount of radiant energy to pass to each of the photo-responsive surfaces of said photo-detection means, said aperture means and the pattern of said optical element being defined by said graphical function, said graphical function being derived from the waveform of said commutation signal and defining a relationship between the operating speed of the cyclic motion of said machine and frequency of said commutation signal, whereby said commutation signal is generated from said photo-detection means as the pattern of said optical element is scanned relative to said aperture means.

65. A method of converting the cyclic motion of an electro-mechanical machine into an electrical signal having a desired waveform, said method comprising the steps of:

(a) modifying a pattern of radiant energy in accordance with a graphical function and in accordance with the cyclic motion of said machine; and (b) generating said electrical signal in response to said modified pattern of radiant energy.

* * * * *

UNITED STATES PATENT AND TRADEMARK OFFICE
CERTIFICATE OF CORRECTION

PATENT NO. : 5,665,965

DATED : September 9, 1997

INVENTOR(S) : Ormonde G. Durham, III

It is certified that error appears in the above-indentified patent and that said Letters Patent is hereby corrected as shown below:

In the Abstract, line 12 "includes graphical function" should read --includes a graphical function--.
In Column 5, line 13 "further object, of the present" should read --further object of the present--.
In Column 23, line 48-49 "derived form the waveform" should read --derived from the waveform--.
In Column 24, line 12 "aperture mans constitutes" should read --aperture means constitutes--.
In Column 24, line 20 "machines an electric motor" should read --machine is an electric motor--.
In Column 26, line 28 "are configures to produce" should read --are configured to produce--.
In Column 26, line 35-36 "are configures to produce" should read --are configured to produce--.
In Column 26, line 36 "a bottom-rounder trapezoidal" should read --a bottom-rounded trapezoidal--.
In Column 26, line 43 "disc, configures to rotate" should read --disc, configured to rotate--.
In Column 26, line 63 "rotational motion using the" should read --rotational motion, using the--.
In Column 27, line 40 "of claim 49, said method" should read --of claim 20, said method--.
In Column 28, line 2 "detectors, and configures to" should read --detectors, and configured to--.
In Column 28, line 11-12 "being configures to rotate" should read --being configured to rotate--.
In Column 28, line 57 "means and configures to be" should read --means and configured to be--.
In Column 30, line 13 "said at leas tone graphically" should read --said at least one graphically--.
In Column 30, line 35 "includes shaped the aperture" should read --includes shaping the aperture--.
In Column 30, line 60 "which is define by a rotating" should read --which is defined by a rotating--.
In Column 31, line 3-4 "phase of said commutation" should read --phase for said commutation--.
In Column 32, line 52 "machine and frequency of" should read --machine and the frequency of--.

Signed and Sealed this

Eighteenth Day of November 1997

Attest:

BRUCE LEHMAN

*Attesting Officer*    *Commissioner of Patents and Trademarks*